US012772283B2

(12) United States Patent
Deogun et al.

(10) Patent No.: US 12,772,283 B2
(45) Date of Patent: Oct. 20, 2026

(54) TECHNIQUES FOR RANDOM ACCESS CHANNEL (RACH) ENHANCEMENTS FOR NEW RADIO UNLICENSED (NR-U) COMMUNICATIONS

(71) Applicant: QUALCOMM Incorporated, San Diego, CA (US)

(72) Inventors: Pravjyot Singh Deogun, Bengaluru (IN); Abhijit Bhattacharya, Bangalore (IN); Xiaoxia Zhang, San Diego, CA (US); Ozcan Ozturk, San Diego, CA (US); Jing Sun, San Diego, CA (US); Kapil Bhattad, Bangalore (IN); Tanumay Datta, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 44 days.

(21) Appl. No.: 17/061,125

(22) Filed: Oct. 1, 2020

(65) Prior Publication Data

US 2021/0136818 A1 May 6, 2021

(30) Foreign Application Priority Data

Oct. 3, 2019 (IN) ............................ 201941039971
Oct. 11, 2019 (IN) ............................ 201941041186
Nov. 15, 2019 (IN) ............................ 201941046609

(51) Int. Cl.
*H04W 74/0808* (2024.01)
*H04W 24/08* (2009.01)
(Continued)

(52) U.S. Cl.
CPC ....... *H04W 74/0808* (2013.01); *H04W 24/08* (2013.01); *H04W 52/36* (2013.01);
(Continued)

(58) Field of Classification Search
CPC . H04W 74/0808; H04W 24/08; H04W 52/36; H04W 72/0446; H04W 74/02;
(Continued)

(56) References Cited

U.S. PATENT DOCUMENTS

2015/0373741 A1* 12/2015 Yerramalli ........ H04W 74/0808 370/336
2016/0100434 A1* 4/2016 Chen ................ H04W 74/0866 370/329

(Continued)

FOREIGN PATENT DOCUMENTS

| | | | |
|---|---|---|---|
| CN | 108476532 | A | 8/2018 |
| CN | 110291835 | A | 9/2019 |
| WO | 2018088422 | A1 | 5/2018 |

OTHER PUBLICATIONS

Ericsson: "Two step Random Access for NR-U", 3GPP Draft, R2-1910786, Two step Ra for NR-U, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019 (Aug. 15, 2019), XP051768554, 3 Pages, Retrieved from the Internet: URL: http://www.3gpp.org/ftp/tsg_ran/WG2_RL2/TSGR2_107/Docs/R2-1910786.zip. [retrieved on Aug. 15, 2019] paragraph [02.1].

(Continued)

*Primary Examiner* — Chirag G Shah
*Assistant Examiner* — Joshua Smith
(74) *Attorney, Agent, or Firm* — Arent Fox LLP/Qualcomm Incorporated

(57) ABSTRACT

The present disclosure relates to wireless communications, and more particularly to enhancements to a random access channel (RACH) procedure for use in New Radio (e.g., 5G) communications in the unlicensed spectrum (also referred to as NR-U). The present disclosure provides a user equipment (Continued)

(UE) or network entity that determines an available RACH occasion (RO) within a slot for a message transmission according to one of a two-step RACH procedure or a four-step RACH procedure, wherein the available RO is adjacent to at least one unavailable RO within the slot. The UE or network entity may further perform, during the RO, the message transmission according to one of the two-step RACH procedure or the four-step RACH procedure.

8 Claims, 15 Drawing Sheets

(51) Int. Cl.
*H04W 52/36* (2009.01)
*H04W 72/0446* (2023.01)
*H04W 74/02* (2009.01)
*H04W 74/0833* (2024.01)
*H04W 76/18* (2018.01)
*H04W 76/19* (2018.01)
*H04W 74/0836* (2024.01)
*H04W 74/0838* (2024.01)

(52) U.S. Cl.
CPC ....... *H04W 72/0446* (2013.01); *H04W 74/02* (2013.01); *H04W 74/0833* (2013.01); *H04W 76/18* (2018.02); *H04W 76/19* (2018.02); *H04W 74/0836* (2024.01); *H04W 74/0838* (2024.01)

(58) Field of Classification Search
CPC . H04W 74/0833; H04W 76/18; H04W 76/19; H04W 74/0836; H04W 74/0838; H04W 52/50
See application file for complete search history.

(56) References Cited

U.S. PATENT DOCUMENTS

| | | | | |
|---|---|---|---|---|
| 2017/0332358 | A1* | 11/2017 | Park | H04W 72/1289 |
| 2018/0097590 | A1* | 4/2018 | Ly | H04W 74/08 |
| 2019/0089509 | A1* | 3/2019 | Wong | H04W 72/042 |
| 2019/0132882 | A1 | 5/2019 | Li et al. | |
| 2019/0223255 | A1 | 7/2019 | Jeon et al. | |
| 2019/0281624 | A1* | 9/2019 | Kim | H04W 74/0833 |
| 2020/0014495 | A1* | 1/2020 | Niu | H04W 72/23 |
| 2020/0021999 | A1* | 1/2020 | Park | H04W 74/0808 |
| 2020/0045650 | A1* | 2/2020 | Suzuki | H04W 52/36 |
| 2020/0107277 | A1* | 4/2020 | Jeon | H04W 74/0866 |
| 2021/0195544 | A1* | 6/2021 | Awad | H04W 74/0833 |
| 2021/0227594 | A1* | 7/2021 | Lee | H04W 74/0833 |
| 2021/0274550 | A1* | 9/2021 | Zhang | H04W 74/0816 |
| 2021/0307072 | A1* | 9/2021 | Kusashima | H04W 74/0833 |
| 2021/0329703 | A1* | 10/2021 | Yang | H04W 72/04 |
| 2021/0352745 | A1* | 11/2021 | Yang | H04W 74/0833 |
| 2022/0039171 | A1* | 2/2022 | Ohara | H04W 72/04 |
| 2022/0217788 | A1* | 7/2022 | Ohara | H04W 74/0833 |
| 2022/0295573 | A1* | 9/2022 | Ohara | H04W 74/006 |
| 2022/0338246 | A1* | 10/2022 | Ohara | H04W 74/0833 |
| 2022/0346156 | A1* | 10/2022 | Ohara | H04W 74/0866 |

OTHER PUBLICATIONS

Huawei, et al., "Timers and Counters for Two-steps Rach", 3GPP Draft, 3GPP TSG-RAN WG2 Meeting #104, R2-1816604, Timers and Counters for Two-step RACH Revised, 3rd Generation Partnership Project (3GPP), Mobile Competence Centre, 650, Route Des Lucioles, F-06921, Sophia-Antipolis Cedex, France, vol. RAN WG2, No. Spokane, US; Nov. 12, 2018-Nov. 16, 2018, Nov. 2, 2018, (Nov. 2, 2018), XP051480550, 74 pages, Retrieved from the Internet: URL: http://www.3gpp.org/ftp/tsg%5Fran/WG2%5FRL2/TSGR2%5F104/Docs/R2%2D1816604%2Ezip, pp. 1-9.
International Search Report and Written Opinion—PCT/US2020/054113—ISA/EPO—Nov. 30, 2020.
Qualcomm Incorporated: "Other Considerations for Two-Step RACH", 3GPP Draft, R1-1907257, Other Considerations for Two-Step RACH, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 13, 2019 (May 13, 2019), XP051728697, 3 Pages, Retrieved from the Internet: URL: http://www.3gpp.org/ftp/Meetings%5F3GPP%5FSYNC/RAN1/Docs/R1%2D1907257%2Ezip. [retrieved on May 13, 2019] paragraph [0003]-[0005].
Huawei., et al., "Timers and Counters for Two-steps RACH", 3GPP TSG-RAN WG2 Meeting #104, R2-1816604 , Spokane, US, Nov. 12-16, 2018, 2 Pages.
Qualcomm Incorporated: "Other Considerations for Two-Step RACH", 3GPP TSG-RAN WG1 Meeting #97, R1-1907257, May 13-May 17, 2019, Reno, USA, pp. 1-3.
Qualcomm Incorporated: "Other Considerations for Two-Step RACH", 3GPP TSG-RAN WG1 Meeting #97, R1-1907257, Reno, USA, May 13-May 17, 2019, May 4, 2019, 3 Pages.
Vivo: "LBT Impacts on 2-step RACH", 3GPP TSG-RAN WG2 Meeting #107, R2-1908692, Prague, Czech Republic, Aug. 26-30, 2019, Aug. 16, 2019, 4 Pages.

* cited by examiner

TECHNIQUES FOR RANDOM ACCESS CHANNEL (RACH) ENHANCEMENTS FOR NEW RADIO UNLICENSED (NR-U) COMMUNICATIONS

CROSS-REFERENCE TO RELATED APPLICATION(S)

This application claims the benefit of Indian Patent Application No. 201941039971, entitled "TECHNIQUES FOR RANDOM ACCESS CHANNEL (RACH) ENHANCEMENTS FOR NEW RADIO UNLICENSED (NR-U) COMMUNICATIONS" and filed on Oct. 3, 2019, Indian Patent Application No. 201941041186, entitled "TECHNIQUES FOR RANDOM ACCESS CHANNEL (RACH) ENHANCEMENTS FOR NEW RADIO UNLICENSED (NR-U) COMMUNICATIONS" and filed on Oct. 11, 2019, and Indian Patent Application No. 201941046609, entitled "TECHNIQUES FOR RANDOM ACCESS CHANNEL (RACH) ENHANCEMENTS FOR NEW RADIO UNLICENSED (NR-U) COMMUNICATIONS" and filed on Nov. 15, 2019, each of which is expressly incorporated by reference herein in its entirety.

BACKGROUND

Aspects of the present disclosure relate generally to wireless communication systems, and more particularly, to random access channel (RACH) enhancements for new radio unlicensed (NR-U) communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, RACH in NR-U implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a user equipment (UE) is provided. The method may include determining at least one listen-before-talk (LBT) parameter for a message to be sent on a physical uplink shared channel (PUSCH) based on a payload of the message, wherein the message to be sent on the PUSCH is associated with a two-step random access channel (RACH) procedure. The method may further include performing a LBT procedure based at least on the LBT parameter to acquire access to an unlicensed spectrum. The method may further include transmitting the message on the PUSCH via the unlicensed spectrum.

In a further aspect, the present disclosure includes an apparatus for wireless communication including a memory and at least one processor coupled to the memory. The at least one processor may be configured to determine at least one LBT parameter for a message to be sent on a PUSCH based on a payload of the message, wherein the message to be sent on the PUSCH is associated with a two-step RACH procedure. The at least one processor may be configured to perform a LBT procedure based at least on the LBT parameter to acquire access to an unlicensed spectrum. The at least one processor may be configured to transmit the message on the PUSCH via the unlicensed spectrum.

In an additional aspect, the present disclosure includes an apparatus for wireless communication including means for determining at least one LBT parameter for a message to be sent on a PUSCH based on a payload of the message, wherein the message to be sent on the PUSCH is associated with a two-step RACH procedure. The apparatus may further include means for performing a LBT procedure based at least on the LBT parameter to acquire access to an unlicensed spectrum. The apparatus may further include means for transmitting the message on the PUSCH via the unlicensed spectrum.

In yet another aspect, the present disclosure includes a non-transitory computer-readable medium storing computer executable code, the code when executed by a processor cause the processor to determine at least one LBT parameter for a message to be sent on a PUSCH based on a payload of the message, wherein the message to be sent on the PUSCH is associated with a two-step RACH procedure. The non-transitory computer-readable medium further including code that when executed by a processor cause the processor to perform a LBT procedure based at least on the LBT parameter to acquire access to an unlicensed spectrum. The non-transitory computer-readable medium further including code that when executed by a processor cause the processor to transmit the message on the PUSCH via the unlicensed spectrum.

One or more of the above examples can further include determining whether a transmission gap between the message on the PUSCH and a message on a physical random access channel (PRACH) satisfies a transmission gap threshold, wherein the LBT procedure is performed based further on a determination that the transmission gap satisfies the transmission gap threshold, and wherein the LBT procedure is a single LBT procedure that covers transmitting both the message on the PRACH and the message on the PUSCH.

One or more of the above examples can further include wherein the LBT procedure corresponds to a category-4 LBT procedure.

One or more of the above examples can further include wherein the message on the PUSCH corresponds to first message of a two-step random access procedure.

According to another example, a method of wireless communication at a node is provided. The method may include performing a LBT procedure for a PRACH transmission and a PUSCH transmission both associated with a two-step RACH procedure. The method further includes determining a failure of the LBT procedure for both of the PRACH and PUSCH transmissions. The method further includes forgoing at least one of an incrementing of a message transmission counter or a power ramping.

In a further aspect, the present disclosure includes an apparatus for wireless communication including a memory and at least one processor coupled to the memory. The at least one processor may be configured to perform a LBT procedure for a PRACH transmission and a PUSCH transmission both associated with a two-step RACH procedure. The at least one processor may be configured to determine a failure of the LBT procedure for both of the PRACH and PUSCH transmissions. The at least one processor may be configured to forgo at least one of an incrementing of a message transmission counter or a power ramping.

In an additional aspect, the present disclosure includes an apparatus for wireless communication including means for performing a LBT procedure for a PRACH transmission and a PUSCH transmission both associated with a two-step RACH procedure. The apparatus further includes means for determining a failure of the LBT procedure for both of the PRACH and PUSCH transmissions. The apparatus further includes means for forgoing at least one of an incrementing of a message transmission counter or a power ramping.

In yet another aspect, the present disclosure includes a non-transitory computer-readable medium storing computer executable code, the code when executed by a processor cause the processor to perform a LBT procedure for a PRACH transmission and a PUSCH transmission both associated with a two-step RACH procedure. The non-transitory computer-readable medium further including code that when executed by a processor cause the processor to determine a failure of the LBT procedure for both of the PRACH and PUSCH transmissions. The non-transitory computer-readable medium further including code that when executed by a processor cause the processor to forgo at least one of an incrementing of a message transmission counter or a power ramping.

One or more of the above examples can further include wherein the PRACH and PUSCH transmissions occur within a same slot.

One or more of the above examples can further include wherein the message transmission counter indicates radio link failure (RLF) detection or a triggering of four-step RACH procedure.

One or more of the above examples can further include determining that the failure of the LBT procedure satisfies a number of consecutive LBT procedure failure threshold, and incrementing a LBT failure counter based on determining that the failure of the LBT procedure satisfies the number of consecutive LBT procedure failure threshold.

One or more of the above examples can further include performing a subsequent two-step random access procedure or four-step random access procedure in response to forgoing at least one of the incrementing of the message transmission counter or a power ramping.

One or more of the above examples can further include wherein forgoing at least one of the incrementing of the message transmission counter or the power ramping comprises forgoing the power ramping, wherein the power ramping corresponds to one of: a common power ramping for both the PRACH and PUSCH transmissions, or an independent power ramping for both the PRACH and PUSCH transmissions.

One or more of the above examples can further include forgoing power ramping for both of the PRACH and PUSCH transmissions based on determining the failure of the LBT procedure.

According to yet another example, a method of wireless communication at a node is provided. The method may include performing a LBT procedure for a PRACH transmission associated with a two-step RACH procedure. The method further includes determining a failure of the LBT procedure for the PRACH transmission. The method further includes forgoing a PUSCH transmission corresponding to the PRACH transmission in the two-step RACH procedure in response to determining the failure of the LBT procedure for the PRACH transmission.

In a further aspect, the present disclosure includes an apparatus for wireless communication including a memory and at least one processor coupled to the memory. The at least one processor may be configured to perform a LBT procedure for a PRACH transmission associated with a two-step RACH procedure. The at least one processor may be configured to determine a failure of the LBT procedure for the PRACH transmission. The at least one processor may be configured to forgo a PUSCH transmission corresponding to the PRACH transmission in the two-step RACH procedure in response to determining the failure of the LBT procedure for the PRACH transmission.

In an additional aspect, the present disclosure includes an apparatus for wireless communication including means for performing a LBT procedure for a PRACH transmission associated with a two-step RACH procedure. The apparatus further includes means for determining a failure of the LBT procedure for the PRACH transmission. The apparatus further includes means for forgoing a PUSCH transmission corresponding to the PRACH transmission in the two-step RACH procedure in response to determining the failure of the LBT procedure for the PRACH transmission.

In yet another aspect, the present disclosure includes a non-transitory computer-readable medium storing computer executable code, the code when executed by a processor cause the processor to perform a LBT procedure for a PRACH transmission associated with a two-step RACH procedure. The non-transitory computer-readable medium further including code that when executed by a processor cause the processor to determine a failure of the LBT procedure for the PRACH transmission. The non-transitory computer-readable medium further including code that when executed by a processor cause the processor to forgo a PUSCH transmission corresponding to the PRACH transmission in the two-step RACH procedure in response to determining the failure of the LBT procedure for the PRACH transmission.

According to a further example, a method of wireless communication at a node is provided. The method may include performing a LBT procedure for a PRACH transmission associated with a two-step RACH procedure. The method may further include determining a failure of the LBT procedure for the PRACH transmission. The method may further include performing the PUSCH transmission corresponding to the PRACH transmission in the 2-step RACH procedure.

In a further aspect, the present disclosure includes an apparatus for wireless communication including a memory and at least one processor coupled to the memory. The at least one processor may be configured to perform a LBT procedure for a PRACH transmission associated with a two-step RACH procedure. The at least one processor may be configured to determine a failure of the LBT procedure for the PRACH transmission. The at least one processor may be configured to perform the PUSCH transmission corresponding to the PRACH transmission in the 2-step RACH procedure.

In an additional aspect, the present disclosure includes an apparatus for wireless communication including means for performing a LBT procedure for a PRACH transmission associated with a two-step RACH procedure. The apparatus may further include means for determining a failure of the LBT procedure for the PRACH transmission. The apparatus may further include means for performing the PUSCH transmission corresponding to the PRACH transmission in the 2-step RACH procedure.

In yet another aspect, the present disclosure includes a non-transitory computer-readable medium storing computer executable code, the code when executed by a processor cause the processor to perform a LBT procedure for a PRACH transmission associated with a two-step RACH procedure. The non-transitory computer-readable medium further including code that when executed by a processor cause the processor to determine a failure of the LBT procedure for the PRACH transmission. The non-transitory computer-readable medium further including code that when executed by a processor cause the processor to perform the PUSCH transmission corresponding to the PRACH transmission in the 2-step RACH procedure.

One or more of the above examples can further include determining to perform the PUSCH transmission based on a time alignment value or when a cell coverage is small.

One or more of the above examples can further include receiving at least one of a configuration indication that indicates whether PUSCH transmission is permitted in response to the failure of the LBT procedure for the PRACH transmission or at least one resource in which the PUSCH transmission can be sent without the PRACH transmission.

One or more of the above examples can further include monitoring fallback random access response (RAR).

One or more of the above examples can further include determining whether a power ramping parameter for the PRACH transmission is different from a power ramping parameter for the PUSCH transmission, and forgo a power ramping for a subsequent PRACH transmission attempt based on determining that the power ramping parameter for the PRACH transmission is different from the power ramping parameter for the PUSCH transmission.

One or more of the above examples can further include forgoing the power ramping for the PUSCH transmission irrespective of whether the PUSCH transmission succeeds based on a determining that the power ramping parameter for the PRACH transmission is not different from the power ramping parameter for the PUSCH transmission.

One or more of the above examples can further include performing the power ramping for the PUSCH transmission based on a determining that the power ramping parameter for the PRACH transmission is not different from the power ramping parameter for the PUSCH transmission.

One or more of the above examples can further include wherein the LBT procedure is associated with contention free random access.

According to a further example, a method of wireless communication at a node is provided. The method may include performing a first LBT procedure for a PRACH transmission and a second LBT procedure for a PUSCH transmission associated with a two-step RACH procedure. The method may further include determining a success of the first LBT procedure for PRACH transmission. The method may further include determining a failure of the second LBT procedure for the PUSCH transmission. The method may further include performing a PUSCH transmission attempt at a subsequent PUSCH resource of a multiple PUSCH transmission opportunities, in response to determining the failure of the second LBT procedure for the PUSCH transmission.

In a further aspect, the present disclosure includes an apparatus for wireless communication including a memory and at least one processor coupled to the memory. The at least one processor may be configured to perform a first LBT procedure for a PRACH transmission and a second LBT procedure for a PUSCH transmission associated with a two-step RACH procedure. The at least one processor may be configured to determine a success of the first LBT procedure for PRACH transmission. The at least one processor may be configured to determine a failure of the second LBT procedure for the PUSCH transmission. The at least one processor may be configured to perform a PUSCH transmission attempt at a subsequent PUSCH resource of a multiple PUSCH transmission opportunities, in response to determining the failure of the second LBT procedure for the PUSCH transmission.

In an additional aspect, the present disclosure includes an apparatus for wireless communication including means for performing a first LBT procedure for a PRACH transmission and a second LBT procedure for a PUSCH transmission associated with a two-step RACH procedure. The apparatus may further include means for determining a success of the first LBT procedure for PRACH transmission. The apparatus may further include means for determining a failure of the second LBT procedure for the PUSCH transmission. The apparatus may further include means for performing a PUSCH transmission attempt at a subsequent PUSCH resource of a multiple PUSCH transmission opportunities, in response to determining the failure of the second LBT procedure for the PUSCH transmission.

In yet another aspect, the present disclosure includes a non-transitory computer-readable medium storing computer executable code, the code when executed by a processor cause the processor to perform a first LBT procedure for a PRACH transmission and a second LBT procedure for a PUSCH transmission associated with a two-step RACH procedure. The non-transitory computer-readable medium further including code that when executed by a processor cause the processor to determine a success of the first LBT procedure for PRACH transmission. T The non-transitory computer-readable medium further including code that when executed by a processor cause the processor to determine a failure of the second LBT procedure for the PUSCH transmission. The non-transitory computer-readable medium further including code that when executed by a processor cause the processor to perform a PUSCH transmission attempt at a subsequent PUSCH resource of a multiple PUSCH transmission opportunities, in response to determining the failure of the second LBT procedure for the PUSCH transmission.

One or more of the above examples can further include wherein the multiple PUSCH transmission opportunities are associated with PRACH resource corresponding to the PRACH transmission.

One or more of the above examples can further include forgoing monitoring for a network response until the PUSCH transmission is successful.

One or more of the above examples can further include determining a failure of all LBT procedures for the PUSCH transmission, and receiving one or both a fallback RAR or a second message of two-step RACH procedure in response to determining the failure of all LBT procedures for the PUSCH transmission.

One or more of the above examples can further include determining whether a power ramping parameter for the PRACH transmission is different from a power ramping parameter for the PUSCH transmission, forgoing power ramping for the PUSCH transmission based on determining that the power ramping parameter for the PRACH transmission is different from the power ramping parameter for the PUSCH transmission; and, performing the power ramping for the PUSCH transmission based on determining that the power ramping parameter for the PRACH transmission is not different from the power ramping parameter for the PUSCH transmission.

One or more of the above examples can further include determining a failure of all LBT procedures for the PUSCH transmission, and monitoring for a fallback RAR during a monitoring duration in response to determining the failure of all LBT procedures for the PUSCH transmission.

One or more of the above examples can further include incrementing a message transmission counter based on determining that a fallback message is not received within the monitoring duration.

One or more of the above examples can further include determining whether a power ramping parameter for the PRACH transmission is different from a power ramping parameter for the PUSCH transmission, forgoing power ramping for the PUSCH transmission based on determining that the power ramping parameter for the PRACH transmission is different from the power ramping parameter for the PUSCH transmission and performing the power ramping for the PUSCH transmission based on determining that the power ramping parameter for the PRACH transmission is not different from the power ramping parameter for the PUSCH transmission.

One or more of the above examples can further include determining a failure of all LBT procedures for the PUSCH transmission, and selecting a different PRACH resource based on determining a failure of all LBT procedures for the PUSCH transmission.

One or more of the above examples can further include wherein selecting the different PRACH resource is further based on a network entity configuration.

One or more of the above examples can further include forgoing at least one of an incrementing of a message transmission counter or a power ramping.

According to an example, a method of wireless communication at a UE is provided. The method may include determining an available RACH occasion (RO) within a slot for a message transmission according to one of a two-step RACH procedure or a four-step RACH procedure, the available RO is adjacent to at least one unavailable RO within the slot. The method further includes performing, during the RO, the message transmission according to one of the two-step RACH procedure or the four-step RACH procedure.

In a further aspect, the present disclosure includes an apparatus for wireless communication including a memory and at least one processor coupled to the memory. The at least one processor may be configured to determine an available RO within a slot for a message transmission according to one of a two-step RACH procedure or a four-step RACH procedure, the available RO is adjacent to at least one unavailable RO within the slot. The at least one processor may be configured to perform, during the RO, the message transmission according to one of the two-step RACH procedure or the four-step RACH procedure.

In an additional aspect, the present disclosure includes an apparatus for wireless communication including means for determining an available RO within a slot for a message transmission according to one of a two-step RACH procedure or a four-step RACH procedure, the available RO is adjacent to at least one unavailable RO within the slot. The apparatus further includes means for performing, during the RO, the message transmission according to one of the two-step RACH procedure or the four-step RACH procedure.

In yet another aspect, the present disclosure includes a non-transitory computer-readable medium storing computer executable code, the code when executed by a processor cause the processor to determine an available RO within a slot for a message transmission according to one of a two-step RACH procedure or a four-step RACH procedure, the available RO is adjacent to at least one unavailable RO within the slot. The at least one processor may further cause the processor to perform, during the RO, the message transmission according to one of the two-step RACH procedure or the four-step RACH procedure.

One or more of the above examples can further include wherein the unavailable RO represents a LBT gap between the available RO and at least one other available RO.

One or more of the above examples can further include wherein the available RO is associated with only one of the two-step RACH procedure or a four-step RACH procedure.

One or more of the above examples can further include wherein the two-step RACH procedure and the four-step RACH procedure is associated with a RACH configuration table, and wherein the available RO is determined based on at least the RACH configuration table.

One or more of the above examples can further include wherein the RACH configuration table include a number of available ROs and a number of unavailable ROs for the two-step RACH procedure and a number of available ROs and a number of unavailable ROs for the four-step RACH procedure.

One or more of the above examples can further include wherein a synchronization signal block (SSB) to RO mapping is valid for the number of available ROs.

One or more of the above examples can further include wherein each available RO for the four-step RACH configuration procedure is adjacent two unavailable ROs.

One or more of the above examples can further include wherein the two unavailable ROs correspond to a LBT gap.

One or more of the above examples can further include wherein a first RO for the two-step RACH procedure corresponds to the available RO.

One or more of the above examples can further include wherein the available RO is used for PRACH transmission.

One or more of the above examples can further include wherein one or more remaining symbols are used for PUSCH transmission.

One or more of the above examples can further include the RACH configuration table allocates all ROs except for a last RO within the number of available ROs for the four-step RACH procedure, and wherein the last RO is allocated as available for the two-step RACH procedure.

One or more of the above examples can further include wherein a number of symbols immediately after the last RO are allocated for a physical uplink shared channel (PUSCH) transmission associated with the two-step RACH procedure.

One or more of the above examples can further include determining that a PRACH transmission occupies an entirety of the slot; and performing the PUSCH transmission in subsequent symbols of the next slot.

One or more of the above examples can further include wherein a last RO within a slot of a four-step RACH procedure corresponds to the at least one unavailable RO, and wherein the two-step RACH procedure and the four-step RACH procedure share a second to last RO.

One or more of the above examples can further include wherein a number of symbols immediately after the second to last RO are allocated for a PUSCH transmission associated with the two-step RACH procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
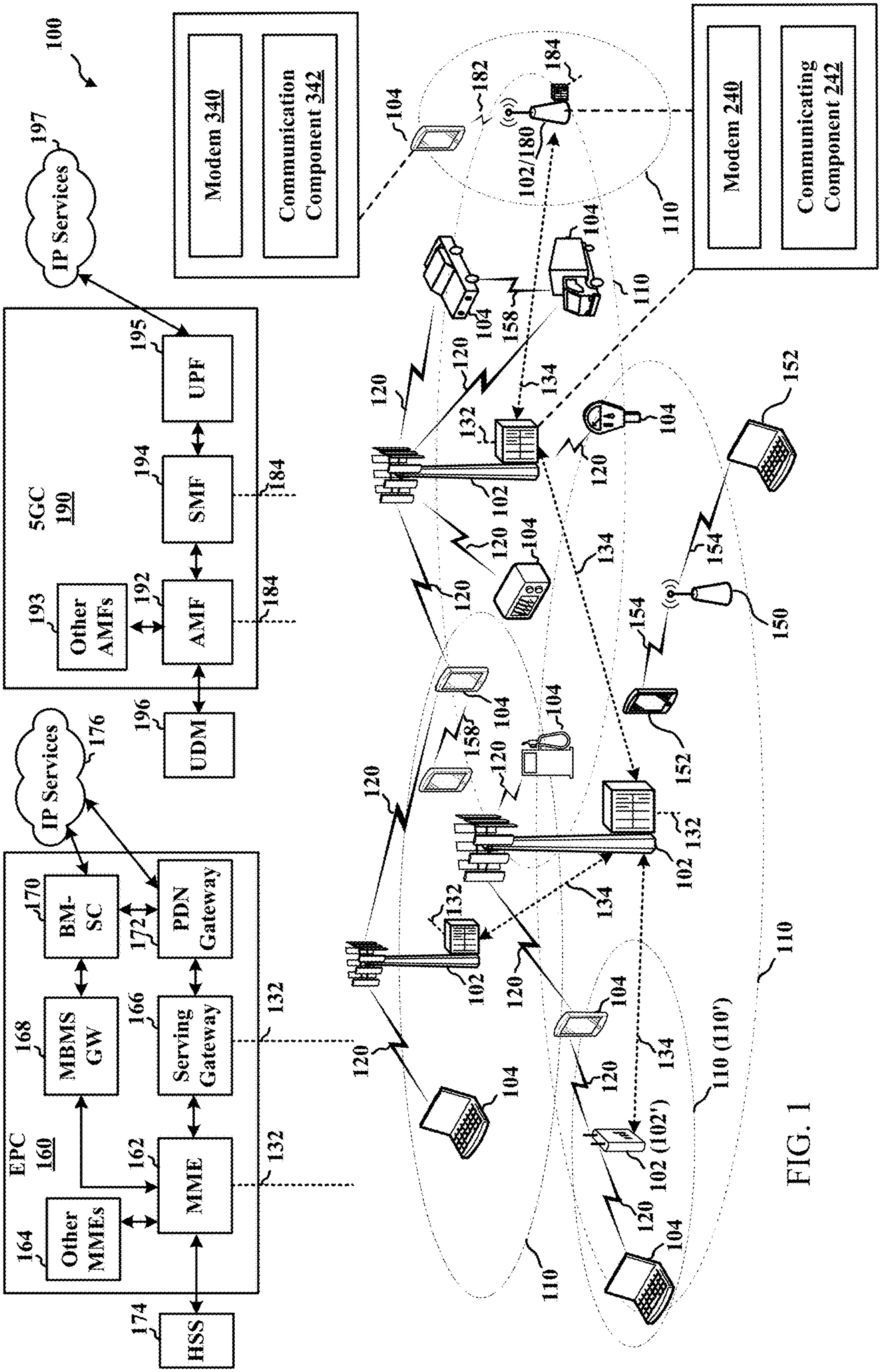
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure relates to wireless communications, and more particularly to enhancements to a random access channel (RACH) procedure for use in New Radio (e.g., 5G) communications in the unlicensed spectrum (also referred to as NR-U). In the unlicensed spectrum, a device wanting to transmit must perform a listen-before-talk (LBT) procedure. As compared to the legacy 4-step RACH procedure, a new 2-step RACH procedure (including a Message A (MsgA) and a Message B (MsgB)) is being considered for use in NR-U. The 2-step RACH procedure may reduce RACH procedure latency and may have a higher LBT success rate, due to the fewer number of steps. Yet, there may still be LBT failures using the 2-step RACH procedure.

The present disclosure provides a number of techniques to address LBT failures and other associated issues when using the 2-step RACH procedure. For example, in one implementation, LBT parameter selection based on a physical uplink shared channel (PUSCH) payload may be performed, e.g., if a single Category-4 LBT (e.g., an LBT with a random back off and with a variable size contention window, so that the contention window size can be configured to avoid coexistence issues) may be implemented for MsgA transmission, then LBT parameter selection may be based on MsgA payload. In another aspect, a PRACH LBT failure for contention free random access may be implemented such that a UE may be allowed to transmit PUSCH even if LBT fails for PRACH transmission based on gNB configuration, and a gNB can configure whether UE monitors for fallback random access response (RAR).

In a further aspect, multiple PUSCH transmission opportunities after PRACH transmission may be implemented, e.g., the UE can perform multiple transmit (Tx) attempts on PUSCH occasions associated with PRACH until LBT succeeds for PUSCH transmission. In another aspect, power ramping techniques may be implemented, for example, for the case of common power ramping of PRACH and PUSCH, power ramping may be based on UE performing successful PRACH transmission, or, for the case of different power ramping of PRACH and PUSCH, power ramping of each channel should be performed based on successful transmission of corresponding channel.

The present application further relates to RACH occasion (RO) scheduling in new radio (NR) for transmissions using unlicensed spectrum. A RACH occasion (RO) is an area specified in a time and frequency domain that is available for the reception of a RACH preamble. In NR, RACH occasions may be scheduled back-to-back or consecutively. In unlicensed spectrum, to avoid LBT blocking, symbol level gaps may be kept or inserted between ROs. In particular, a gap can be created by using alternate ROs. For example, with 5G preamble format A1, if there are 6 ROs, only RO #0, 2, 4 may be valid while RO #1, 3, 5 may be invalid. In other words, a UE may transmit using RO #0, 2, and/or 4, but not on RO #1, 3, or 5 to mitigate LBT blocking. Specifically, RACH configuration tables for both 2-step and 4-step RACH may have a VALID RO column. In some aspects, invalid ROs may be kept for the purpose of LBT gaps and as well as coexistence between 2-step and 4-step RACH.

In one implementation, a UE in an NR-U system may determine at least one LBT parameter for a message to be sent on a PUSCH based on a payload of the message, wherein the message to be sent on the PUSCH is associated with a two-step RACH procedure. The UE may further perform a LBT procedure based at least on the LBT parameter to acquire access to an unlicensed spectrum. The UE may further transmit the message on the PUSCH via the unlicensed spectrum.

In another implementation, a UE in an NR-U system may perform a LBT procedure for a PRACH transmission and a physical uplink shared channel (PUSCH) transmission both associated with a two-step RACH procedure. The UE may further determine a failure of the LBT procedure for both of the PRACH and PUSCH transmissions. The UE may further forgo at least one of an incrementing of a message transmission counter or a power ramping.

In another implementation, a UE in an NR-U system may perform a LBT procedure for a PRACH transmission associated with a two-step RACH procedure. A UE may further determine a failure of the LBT procedure for the PRACH transmission. A UE may further forgo a physical uplink shared channel (PUSCH) transmission corresponding to the PRACH transmission in the two-step RACH procedure in response to determining the failure of the LBT procedure for the PRACH transmission.

In another implementation, a UE in an NR-U system perform a LBT procedure for a PRACH transmission associated with a two-step RACH procedure. A UE may further determine a failure of the LBT procedure for the PRACH transmission. The UE may further perform the PUSCH transmission corresponding to the PRACH transmission in the 2-step RACH procedure.

In yet another implementation, a UE in an NR-U system may perform a first LBT procedure for a PRACH transmission and a second LBT procedure for a PUSCH transmission associated with a two-step RACH procedure. The UE may further determine a success of the first LBT procedure for PRACH transmission. The UE may further determine a failure of the second LBT procedure for the PUSCH transmission. The UE may further perform a PUSCH transmission attempt at a subsequent PUSCH resource of a multiple PUSCH transmission opportunities, in response to determining the failure of the second LBT procedure for the PUSCH transmission.

In yet another implementation, a UE or network entity may determine an available RACH RO within a slot for a message transmission according to one of a two-step RACH procedure or a four-step RACH procedure, the available RO is adjacent to at least one unavailable RO within the slot to provide an LBT gap. The UE or network entity may further perform, during the RO, the message transmission according to one of the two-step RACH procedure or the four-step RACH procedure.

The described features will be presented in more detail below with reference to FIGS. 1-15.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as UE 104 of the wireless communication system may have a modem 340 and communicating component 342 for facilitating RACH procedures in an NR-U system, as described herein. In another example, some nodes, such as base station 102/gNB 180, may have a modem 240 and communicating component 242 for facilitating RACH procedures, as described herein. Though a UE 104 is shown as having the modem 340 and communicating component 342 and a base station 102/gNB 180 is shown as having the modem 240 and communicating component 242, this is one illustrative example, and substantially any node or type of node acting as an IAB node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). Alternatively, or in addition, the base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some implementations, the RACH component 244 may be configured to facilitate RACH procedures in an NR-U system. For example, failure to acquire a channel has been established to be one of the major drawback of using unlicensed channel. The effect of such failure may also exist in connection establishment procedure of a cell, as random access procedure can have frequent LBT failures, which may lead to high delay and increased interference caused in unlicensed channel due to RACH retransmissions. The present implementations may help to make random access procedure more robust in presence of LBT failures.

Further, for 2-step RACH procedures, only two messages per random access procedure may be transmitted. Specifically, MsgA from UE (first message in 2-step RACH) may include the PRACH transmission and the PUSCH transmission carrying a payload. MsgB from gNB (second message in 2-step RACH) may include contention resolution message, time alignment, following UL grant, and UE identity information. Fallback Random Access Response (RAR) may be transmitted by gNB when it receives the PRACH but is not able to decode the PUSCH corresponding to MsgA. This is expected to reduce random access procedure latency as well as higher LBT success rate. However, LBT failure may still occur for 2-step RACH. Various scenarios may be considered for LBT failure along with associated UE actions to resolve the case.

One implementation relates to LBT parameter selection for MsgA. For example, for 4-step random access procedure, PRACH can be transmitted by the UE using a Category-4 LBT with highest channel access priority, while LBT for Msg3 transmission is based on the content of the data. However, LBT parameter selection for MsgA may also be configured to consider the transmission gap between PRACH and the associated PUSCH. Hence, if the transmission gap between PUSCH and PRACH is less than 16 microseconds (μs), then a single Cat-4 LBT procedure may be performed whose parameters are based on payload of MsgA. The transmission gap may be selected by UE/configured by gNB such that either it is less than 16 μs or it is large enough to allow Cat-4 LBT for PUSCH after PRACH transmission corresponding to MsgA.

Another implementation relates to the impact due to LBT failures. For example, at least three scenarios may occur assuming that PRACH transmission is either performed at the same time as PUSCH or earlier than PUSCH transmission. In a first scenario, LBT failure may occur on both PRACH and PUSCH. Note that this scenario is applicable when PRACH and PUSCH occur within same slot, or when UE is required to perform PUSCH transmission even after PRACH LBT failure. A first solution includes no need to increment MsgA transmission counter. Note that MsgA transmission counter may be used for radio link failure (RLF) detection or fallback to 4-step RACH. For consistent LBT failure detection, LBT failure counter may still be incremented based on the number of times LBT is performed by UE for MsgA. A second solution provides that power ramping not be performed for the next RACH attempt, where the next RACH attempt can be either 2-step or 4-step. If common power ramping is used for both PUSCH and PRACH, then there is no need to perform power ramping. If different power ramping is used for PUSCH and PRACH, then power ramping should not be performed for either channel.

In a second scenario related to LBT failure on PRACH, the PRACH transmission may be performed before attempting PUSCH transmission. In a first option, PUSCH transmission may be skipped and follow the same procedure as the first scenario. In a second option, PUSCH transmission may be allowed even if LBT failed for PRACH. Note that this is applicable for contention free random access performed on small cells. The second option may be applied in at least one of a number of ways. First, if a time alignment (TA) is valid at UE (for e.g. on scheduling request failure). Second, if the TA difference is very small (e.g., can be determined based on received signal strength). Third, the UE can perform PUSCH transmission without PRACH when cell coverage is small (for instance, the gNB can indicate cell coverage to the UE).

Since the second option involves the gNB performing blind detection, some gNBs may choose not to implement this feature. As such, the gNB can have some control whether this procedure is allowed or not. In one example, a 1 bit configuration indicating enabled/disabled may be sent by the gNB to the UE. In another example, the gNB can indicate to the UE the MsgA resources where PUSCH can be transmitted without associated PRACH.

The UE monitoring procedure may include the UE monitoring for successful MsgB reception. The UE may also determine whether to monitor fallback random access response (RAR). In one example, the UE may monitor for fallback RAR (e.g., this is because gNB can detect a demodulation reference signal (DM-RS) even if it is not able to decode PUSCH). In another example, the gNB can configure whether UE monitors for fallback RAR or not (for e.g., DM-RS detection without PRACH can be gNB implementation).

For power ramping, if power ramping is different for PRACH and PUSCH, then UE may not perform power ramping for PRACH for the next attempt. For PUSCH power ramping, power ramping may not be performed for PUSCH (e.g., irrespective of PUSCH success), or power ramping of PUSCH may be performed if PUSCH transmission succeeds. Otherwise, if common power ramping is used for PRACH and PUSCH, the UE may not perform power ramping for next attempt (e.g., irrespective of PUSCH success), or the UE performs power ramping if PUSCH transmission succeeds.

In a third scenario related to PRACH success but LBT failure on PUSCH, if multiple PUSCH transmission opportunities are associated to single PRACH resource, then UE may perform a transmission attempt at the next PUSCH resource. The UE may not initiate monitoring for network response until PUSCH is successfully transmitted. For example, when LBT fails for all PUSCH attempts, the UE may perform any one of a number of techniques. In one example, the UE may attempt to receive both fallback RAR and MsgB. This is a UE procedure after transmission of MsgA. If power ramping is different for PRACH and PUSCH, then UE may not perform power ramping for PUSCH.

Otherwise, if common power ramping is performed, then power ramping may be performed for next attempt. In another example, the UE may only monitor for fallback RAR. MsgA transmission counter may be incremented if fallback message is not received within monitoring duration. If power ramping is different for PRACH and PUSCH, then UE may not perform power ramping for PUSCH. Otherwise, if common power ramping is performed, then power ramping may be performed for next attempt. In yet another example, the may UE go back to resource selection step. This can be based on gNB configuration that UE may not monitor for network response if PUSCH fails. In some aspects, no power ramping would be performed in this case, and no need to increment MsgA transmission counter.

In another implementation, to avoid LBT blocking, symbol level gaps may be kept or inserted between ROs. In particular, a gap can be created by using alternate ROs. For example, with format A1, if there are 6 ROs, only RO #0, 2, 4 may be valid while RO #1, 3, 5 may be invalid. In other words, a UE may transmit using RO #0, 2, and/or 4, but not on RO #1, 3, or 5 to mitigate LBT blocking. Specifically, RACH configuration tables for both 2-step and 4-step RACH may have a VALID RO column. In some aspects, invalid ROs may be kept for the purpose of LBT gaps and as well as coexistence between 2-step and 4-step RACH.

In summary, the RACH component 244 may be configured to perform an enhanced 2-step RACH procedure in an NR-U system, e.g., assuming that PRACH transmission is either performed at the same time as PUSCH or earlier than PUSCH transmission, to account for LBT failures. In one example, LBT parameter selection may be based on PUSCH payload such that if a single Cat-4 LBT is performed for MsgA transmission, then the LBT parameter selection may be based on a MsgA payload. In another example, PRACH LBT failure for contention free random access may allow a UE to transmit PUSCH even if LBT fails for PRACH transmission based on gNB configuration.

In some aspects, the gNB can configure whether UE monitors for fallback RAR. In a further example, multiple PUSCH transmission opportunities after a PRACH transmission may permit a UE to perform multiple transmission attempts on PUSCH occasions associated with PRACH until the LBT succeeds for PUSCH transmission. In yet another example, the power ramping impact may be such that for the case of common power ramping of PRACH and PUSCH, power ramping is based on UE performing successful PRACH transmission, and for the case of different power ramping of PRACH and PUSCH, power ramping of each channel should be performed based on successful transmission of corresponding channel. In a further example, symbol level gaps between ROs may be introduced and configured according to a RACH configuration table.

Turning now to FIGS. 2-9, aspects are depicted with reference to one or more components and one or more methods that may perform the actions or operations described herein, where aspects in dashed line may be optional. Although the operations described below in FIGS. 4-9 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
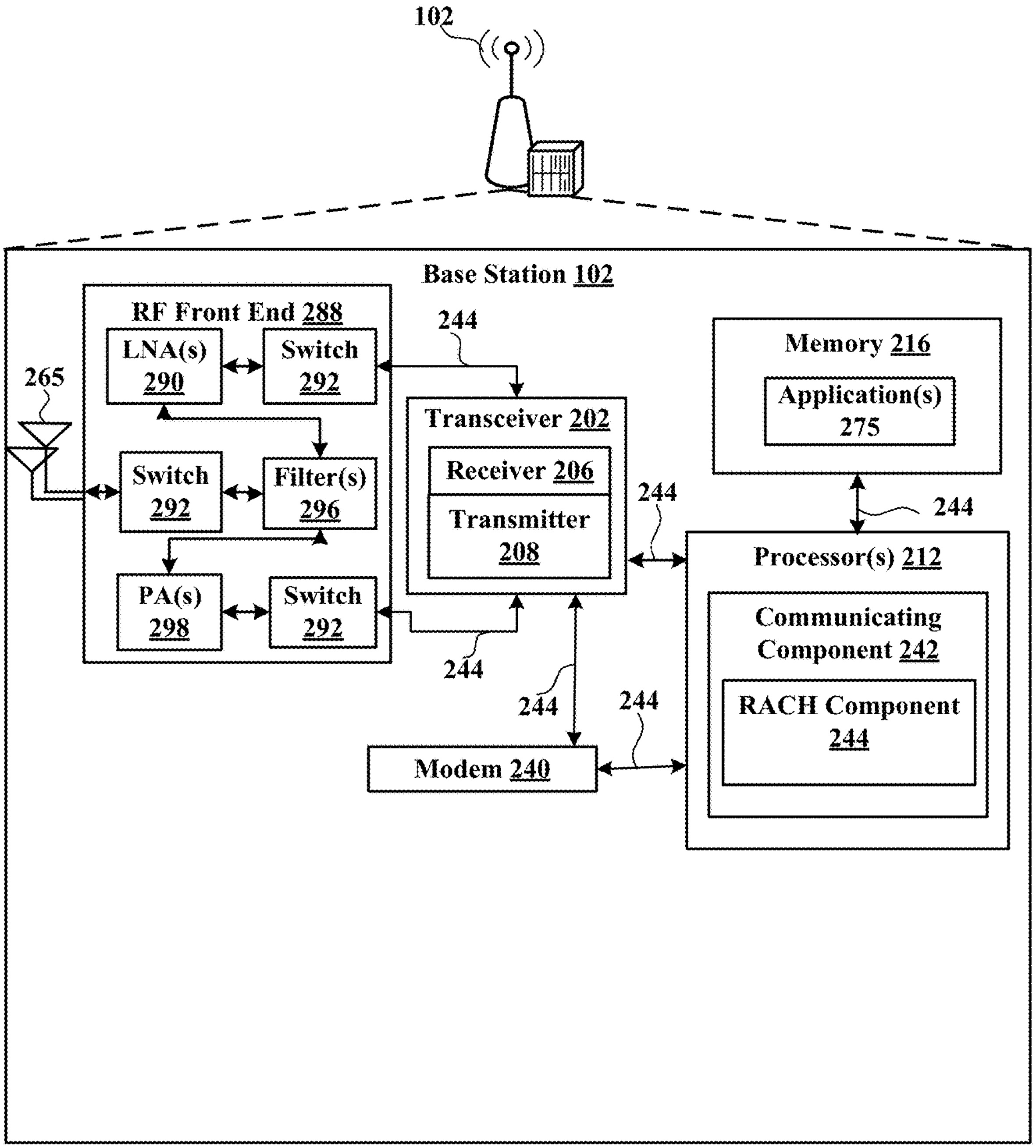
FIG. 2 is a block diagram illustrating an example of a network entity (also referred to as a base station), in accordance with various aspects of the present disclosure.

Referring to FIG. 2, one example of an implementation of a node such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 including RACH component 244 for facilitating RACH procedures in conjunction with a UE such as UE 104.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 15. Similarly, the memory 216 may correspond to the memory described in connection with the UE in FIG. 15.

Figure 3:
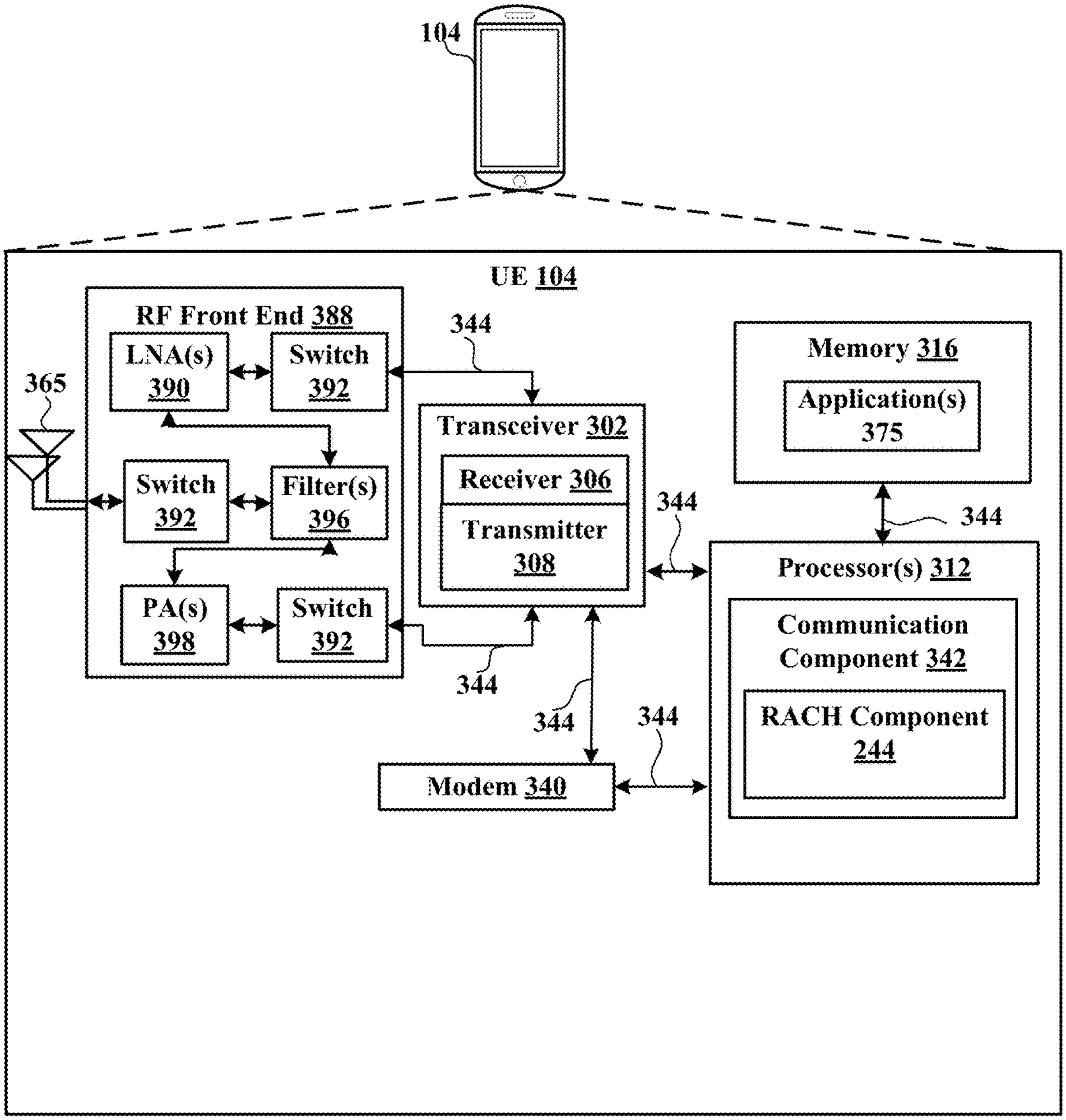
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or communication component 342 including RACH component 244 for facilitating RACH procedure in an NR-U communication system.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 9. Similarly, the memory 316 may correspond to the memory described in connection with the base station in FIG. 15.

Turning now to FIGS. 4-9, aspects are depicted with reference to one or more components and one or more methods that may perform the actions or operations described herein, where aspects in dashed line may be optional. Although the operations described below in FIGS. 4-9 are presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 2, 3 and/or 15, as described herein, a specially-programmed processor, a processor executing specially-programmed software or computer-readable media, or by any other combination of a hardware component and/or a software component capable of performing the described actions or functions.

Figure 4:
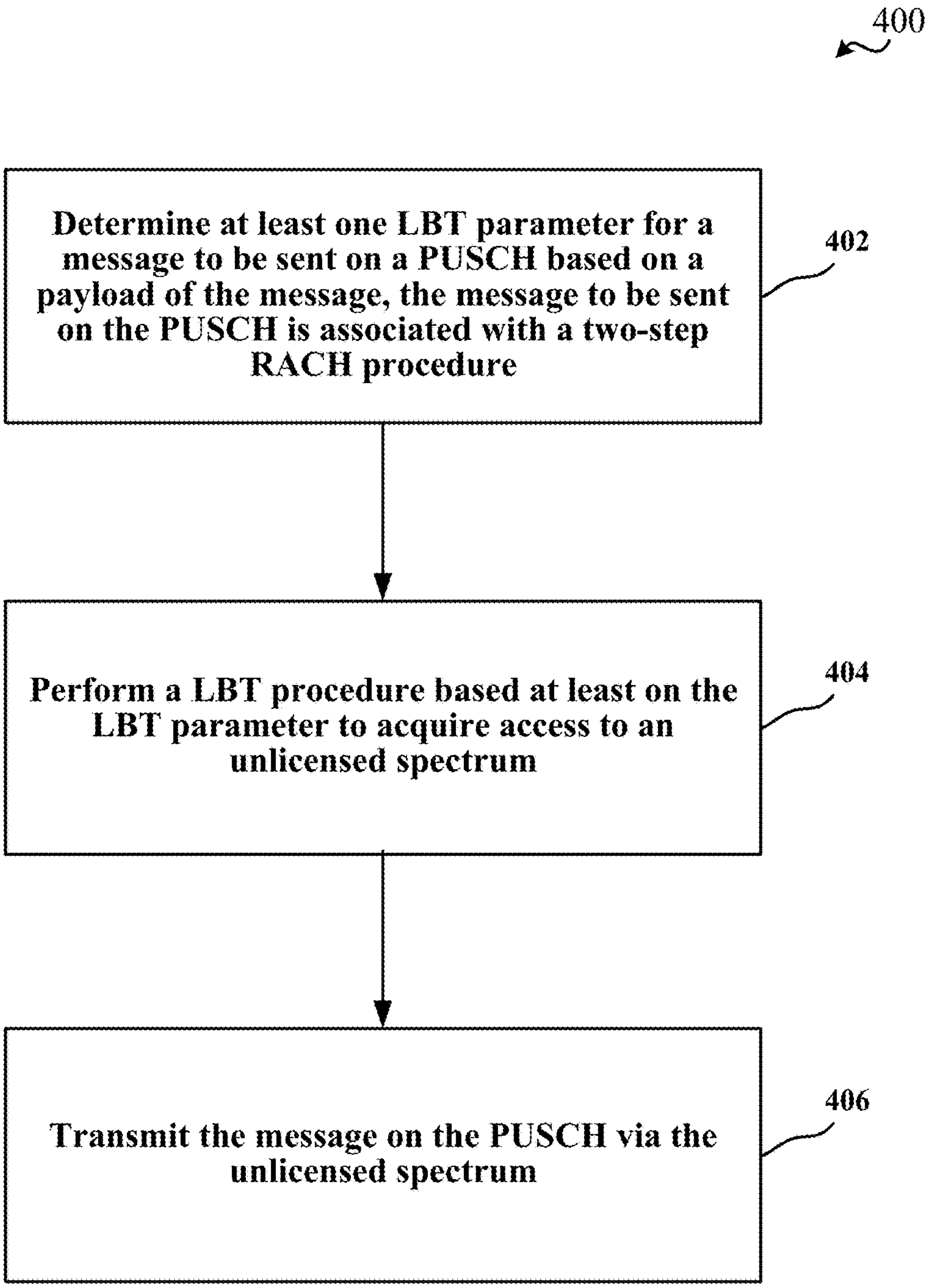
FIG. 4 is a flow chart illustrating an example of a method for wireless communications at a UE, in accordance with various aspects of the present disclosure, e.g., LBT parameter selection based on physical uplink shared channel (PUSCH) payload.

FIG. 4 illustrates a flow chart of an example of a method 400 for wireless communication at a UE. In an example, a UE 104 can perform the functions described in method 400 using one or more of the components described in FIGS. 1, 3, and 15.

At block 402, the method 400 may determine at least one LBT parameter for a message to be sent on a PUSCH based on a payload of the message, the message to be sent on the PUSCH is associated with a two-step RACH procedure. In an aspect, the communication component 342 including the RACH component 244, e.g., in conjunction with processor(s) 312, memory 316, and/or transceiver 302, may be configured to determine at least one LBT parameter for a message to be sent on a PUSCH based on a payload of the message, the message to be sent on the PUSCH is associated with a two-step RACH procedure, as described above in more detail. Thus, the UE 104, the processor(s) 312, the communication component 342 or one of its subcomponents may define the means for determining at least one LBT parameter for a message to be sent on a PUSCH based on a payload of the message, the message to be sent on the PUSCH is associated with a two-step RACH procedure.

At block 404, the method 400 may perform a LBT procedure based at least on the LBT parameter to acquire access to an unlicensed spectrum. In an aspect, the communication component 342 including the RACH component 244, e.g., in conjunction with processor(s) 312, memory 316, and/or transceiver 302, may be configured to perform a LBT procedure based at least on the LBT parameter to acquire access to an unlicensed spectrum. For example, the communication component 342 may exclude the set of one or more resources 246 from a set of resources to be used for both the uplink transmission and the downlink transmission, as described above in more detail. Thus, the UE 104, the processor(s) 312, the communication component 342 or one of its subcomponents may define the means for performing a LBT procedure based at least on the LBT parameter to acquire access to an unlicensed spectrum.

At block 406, the method 400 may transmit the message on the PUSCH via the unlicensed spectrum. In an aspect, the communication component 342 including the RACH component 244, e.g., in conjunction with processor(s) 312, memory 316, and/or transceiver 302, may be configured to transmit the message on the PUSCH via the unlicensed spectrum, as described above in more detail. Thus, the UE 104, the processor(s) 312, the communication component 342 or one of its subcomponents may define the means for transmitting the message on the PUSCH via the unlicensed spectrum.

In some aspects, the method 400 may optionally include determining whether a transmission gap between the message on the PUSCH and a message on a PRACH satisfies a transmission gap threshold, wherein the LBT procedure is performed based further on a determination that the transmission gap satisfies the transmission gap threshold, and wherein the LBT procedure is a single LBT procedure that covers transmitting both the message on the PRACH and the message on the PUSCH.

In some aspects, the LBT procedure may correspond to a category-4 LBT procedure.

In some aspects, the message on the PUSCH may correspond to first message of a two-step random access procedure.

Figure 5:
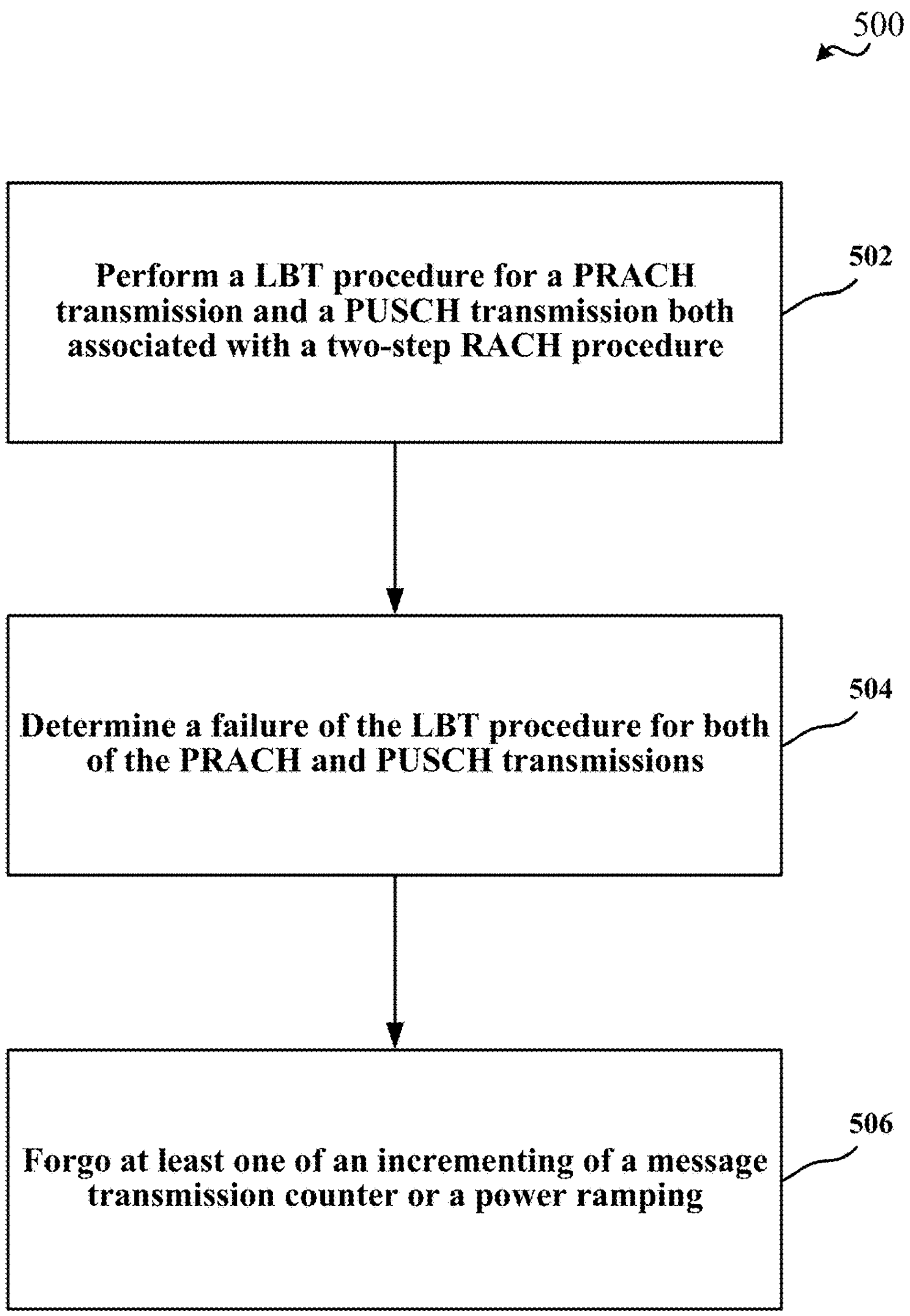
FIG. 5 is a flow chart illustrating an example of a method for wireless communications at a UE, in accordance with various aspects of the present disclosure, e.g., listen-before-talk (LBT) failure on both physical random access channel (PRACH) and PUSCH.

FIG. 5 illustrates a flow chart of an example of a method 500 for wireless communication at a UE. In an example, a UE 104 can perform the functions described in method 500 using one or more of the components described in FIGS. 1, 3, and 15.

At block 502, the method 500 may perform a LBT procedure for a PRACH transmission and a PUSCH transmission both associated with a two-step RACH procedure. In an aspect, the communication component 342 including the RACH component 244, e.g., in conjunction with processor(s) 312, memory 316, and/or transceiver 302, may be configured to perform a LBT procedure for a PRACH transmission and a PUSCH transmission both associated with a two-step RACH procedure, as described above in more detail. Thus, the UE 104, the processor(s) 312, the communication component 342 or one of its subcomponents may define the means for performing a LBT procedure for a PRACH transmission and a PUSCH transmission both associated with a two-step RACH procedure.

At block 504, the method 500 may determine a failure of the LBT procedure for both of the PRACH and PUSCH transmissions. In an aspect, the communication component 342 including the RACH component 244, e.g., in conjunction with processor(s) 312, memory 316, and/or transceiver 302, may be configured to determine a failure of the LBT procedure for both of the PRACH and PUSCH transmissions, as described above in more detail. Thus, the UE 104, the processor(s) 312, the communication component 342 or one of its subcomponents may define the means for determining a failure of the LBT procedure for both of the PRACH and PUSCH transmissions.

At block 506, the method 500 may forgo at least one of an incrementing of a message transmission counter or a power ramping. In an aspect, the communication component 342 including the RACH component 244, e.g., in conjunction with processor(s) 312, memory 316, and/or transceiver 302, may be configured to forgo at least one of an incrementing of a message transmission counter or a power ramping, as described above in more detail. Thus, the UE 104, the processor(s) 312, the communication component 342 or one of its subcomponents may define the means for forgoing at least one of an incrementing of a message transmission counter or a power ramping.

In some aspects, the PRACH and PUSCH transmissions may occur within a same slot.

In some aspects, the message transmission counter may indicate radio link failure (RLF) detection or a triggering of four-step RACH procedure.

In some aspects, the method 500 may include determining that the failure of the LBT procedure satisfies a number of consecutive LBT procedure failure threshold, and incrementing a LBT failure counter based on determining that the failure of the LBT procedure satisfies the number of consecutive LBT procedure failure threshold.

In some aspects, the method 500 may include performing a subsequent two-step random access procedure or four-step random access procedure in response to forgoing at least one of the incrementing of the message transmission counter or a power ramping.

In some aspects, forgoing at least one of the incrementing of the message transmission counter or the power ramping comprises forgoing the power ramping, wherein the power ramping corresponds to one of a common power ramping for both the PRACH and PUSCH transmissions, or an independent power ramping for both the PRACH and PUSCH transmissions.

In some aspects, the method 500 may include forgoing power ramping for both of the PRACH and PUSCH transmissions based on determining the failure of the LBT procedure.

Figure 6:
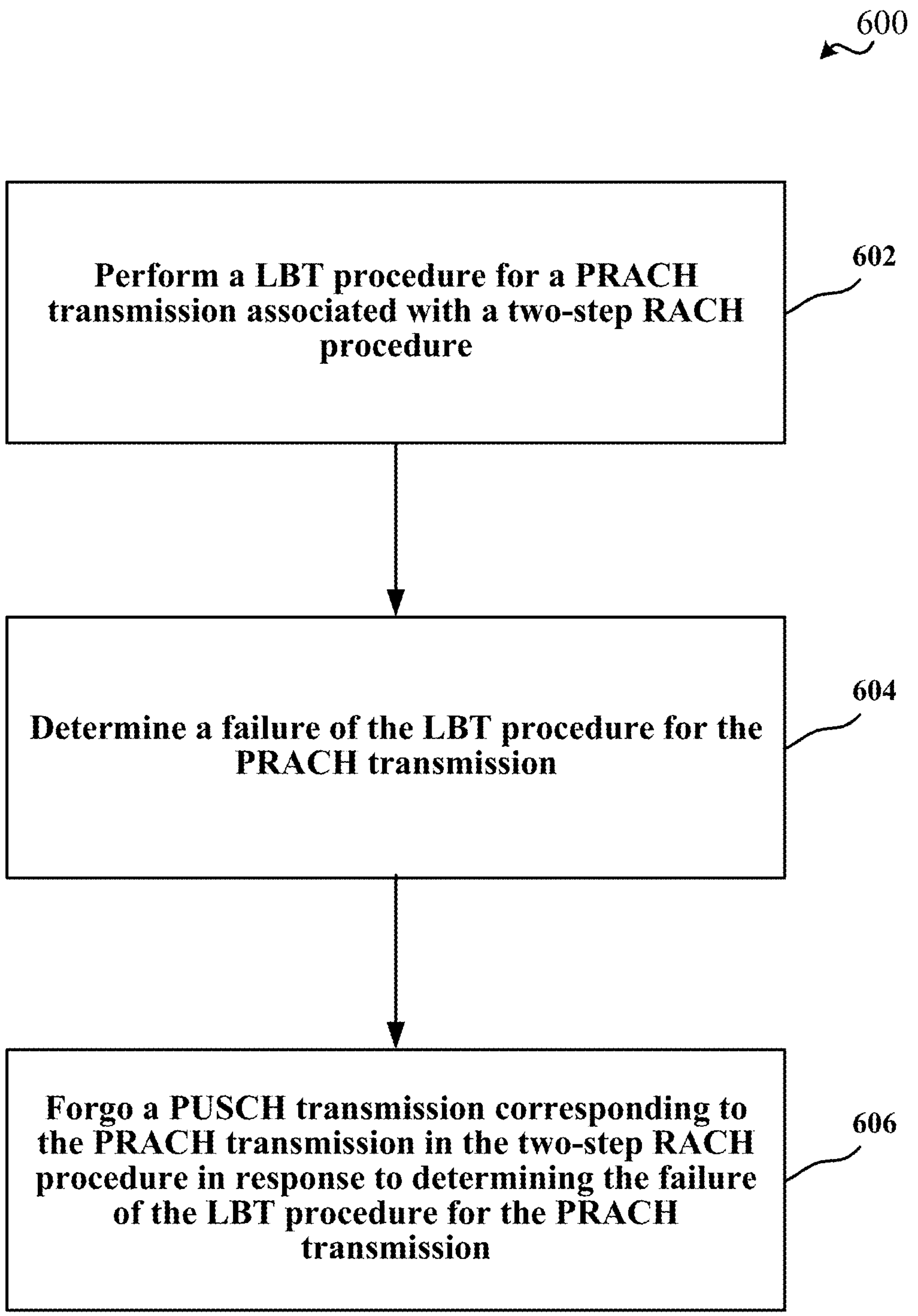
FIG. 6 is a flow chart illustrating an example of a method for wireless communications at a UE, in accordance with various aspects of the present disclosure, e.g., LBT failure on PRACH.

FIG. 6 illustrates a flow chart of an example of a method 600 for wireless communication at a UE. In an example, a UE 104 can perform the functions described in method 600 using one or more of the components described in FIGS. 1, 3, and 15.

At block 602, the method 600 may perform a LBT procedure for a PRACH transmission associated with a two-step RACH procedure. In an aspect, the communication component 342 including the RACH component 244, e.g., in conjunction with processor(s) 312, memory 316, and/or transceiver 302, may be configured to perform a LBT procedure for a PRACH transmission associated with a two-step RACH procedure, as described above in more detail. Thus, the UE 104, the processor(s) 312, the communication component 342 or one of its subcomponents may define the means for performing a LBT procedure for a PRACH transmission associated with a two-step RACH procedure.

At block 604, the method 600 may determine a failure of the LBT procedure for the PRACH transmission. In an aspect, the communication component 342 including the RACH component 244, e.g., in conjunction with processor (s) 312, memory 316, and/or transceiver 302, may be configured to determine a failure of the LBT procedure for the PRACH transmission, as described above in more detail. Thus, the UE 104, the processor(s) 312, the communication component 342 or one of its subcomponents may define the means for determining a failure of the LBT procedure for the PRACH transmission.

At block 606, the method 600 may forgo a PUSCH transmission corresponding to the PRACH transmission in the two-step RACH procedure in response to determining the failure of the LBT procedure for the PRACH transmission. In an aspect, the communication component 342 including the RACH component 244, e.g., in conjunction with processor(s) 312, memory 316, and/or transceiver 302, may be configured to forgo a PUSCH transmission corresponding to the PRACH transmission in the two-step RACH procedure in response to determining the failure of the LBT procedure for the PRACH transmission, as described above in more detail. Thus, the UE 104, the processor(s) 312, the communication component 342 or one of its subcomponents may define the means for forgoing a PUSCH transmission corresponding to the PRACH transmission in the two-step RACH procedure in response to determining the failure of the LBT procedure for the PRACH transmission.

Figure 7:
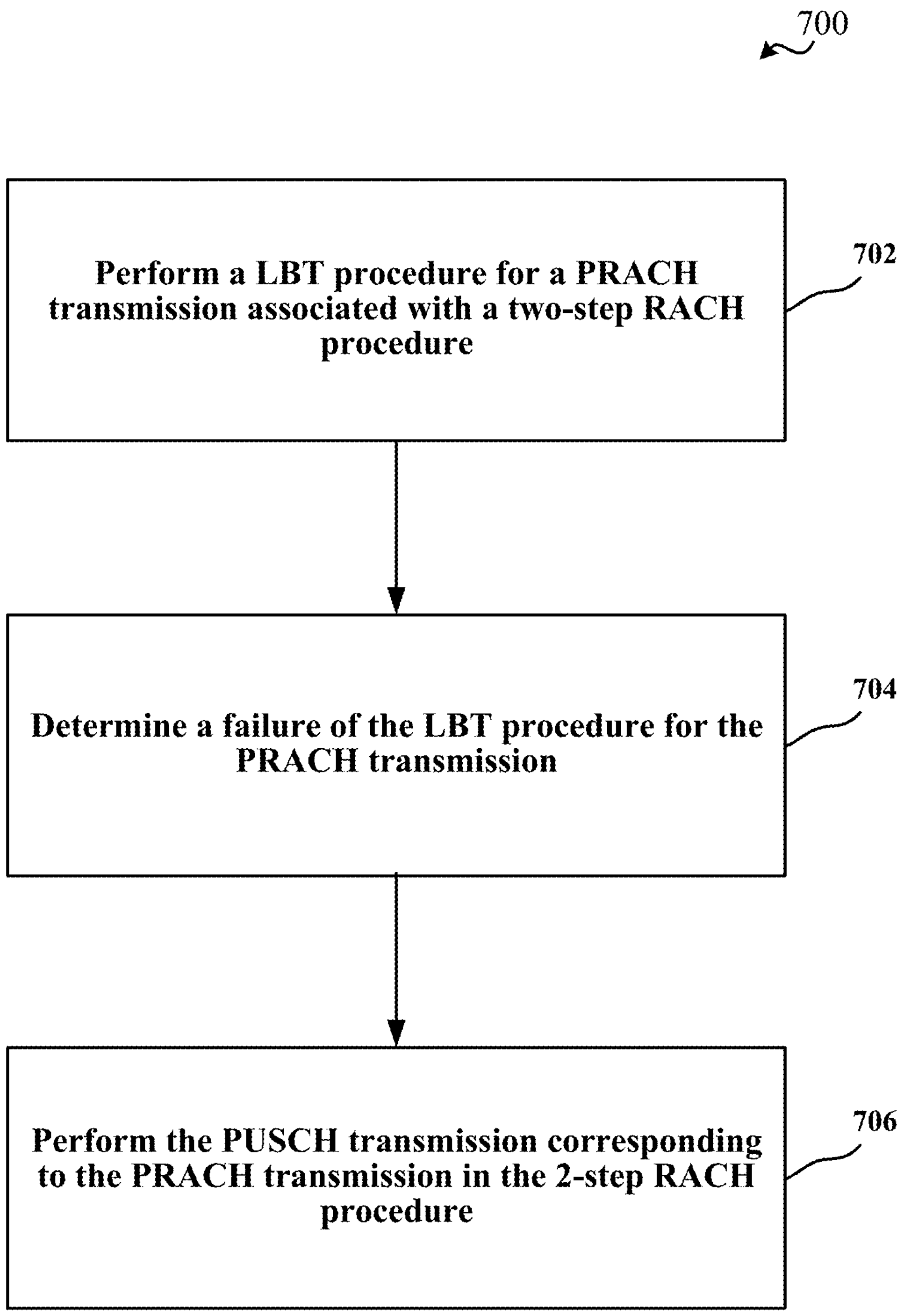
FIG. 7 is a flow chart illustrating an example of a method for wireless communications in accordance with various aspects of the present disclosure, e.g., LBT failure on PRACH.

FIG. 7 illustrates a flow chart of an example of a method 700 for wireless communication at a UE. In an example, a UE 104 can perform the functions described in method 700 using one or more of the components described in FIGS. 1, 3, and 15.

At block 702, the method 700 may perform a LBT procedure for a PRACH transmission associated with a two-step RACH procedure. In an aspect, the communication component 342 including the RACH component 244, e.g., in conjunction with processor(s) 312, memory 316, and/or transceiver 302, may be configured to perform a LBT procedure for a PRACH transmission associated with a two-step RACH procedure, as described above in more detail. Thus, the UE 104, the processor(s) 312, the communication component 342 or one of its subcomponents may define the means for performing a LBT procedure for a PRACH transmission associated with a two-step RACH procedure.

At block 704, the method 700 may determine a failure of the LBT procedure for the PRACH transmission. In an aspect, the communication component 342 including the RACH component 244, e.g., in conjunction with processor (s) 312, memory 316, and/or transceiver 302, may be configured to determine a failure of the LBT procedure for the PRACH transmission, as described above in more detail. Thus, the UE 104, the processor(s) 312, the communication component 342 or one of its subcomponents may define the means for determining a failure of the LBT procedure for the PRACH transmission.

At block 706, the method 700 may perform the PUSCH transmission corresponding to the PRACH transmission in the 2-step RACH procedure. In an aspect, the communication component 342 including the RACH component 244, e.g., in conjunction with processor(s) 312, memory 316, and/or transceiver 302, may be configured to perform the PUSCH transmission corresponding to the PRACH transmission in the 2-step RACH procedure, as described above in more detail. Thus, the UE 104, the processor(s) 312, the communication component 342 or one of its subcomponents may define the means for performing the PUSCH transmission corresponding to the PRACH transmission in the 2-step RACH procedure.

In some aspects, the method 700 may include determining to perform the PUSCH transmission based on a time alignment value or when a cell coverage is small.

In some aspects, the method 700 may include receiving at least one of a configuration indication that indicates whether PUSCH transmission is permitted in response to the failure of the LBT procedure for the PRACH transmission or at least one resource in which the PUSCH transmission can be sent without the PRACH transmission.

In some aspects, the method 700 may include monitoring fallback random access response (RAR).

In some aspects, the method 700 may include determining whether a power ramping parameter for the PRACH transmission is different from a power ramping parameter for the PUSCH transmission, and forgo a power ramping for a subsequent PRACH transmission attempt based on determining that the power ramping parameter for the PRACH transmission is different from the power ramping parameter for the PUSCH transmission.

In some aspects, the method 700 may include forgo the power ramping for the PUSCH transmission irrespective of whether the PUSCH transmission succeeds based on a determining that the power ramping parameter for the PRACH transmission is not different from the power ramping parameter for the PUSCH transmission.

In some aspects, the method 700 may include performing the power ramping for the PUSCH transmission based on a determining that the power ramping parameter for the PRACH transmission is not different from the power ramping parameter for the PUSCH transmission.

In some aspects, the LBT procedure may be associated with contention free random access.

Figure 8:
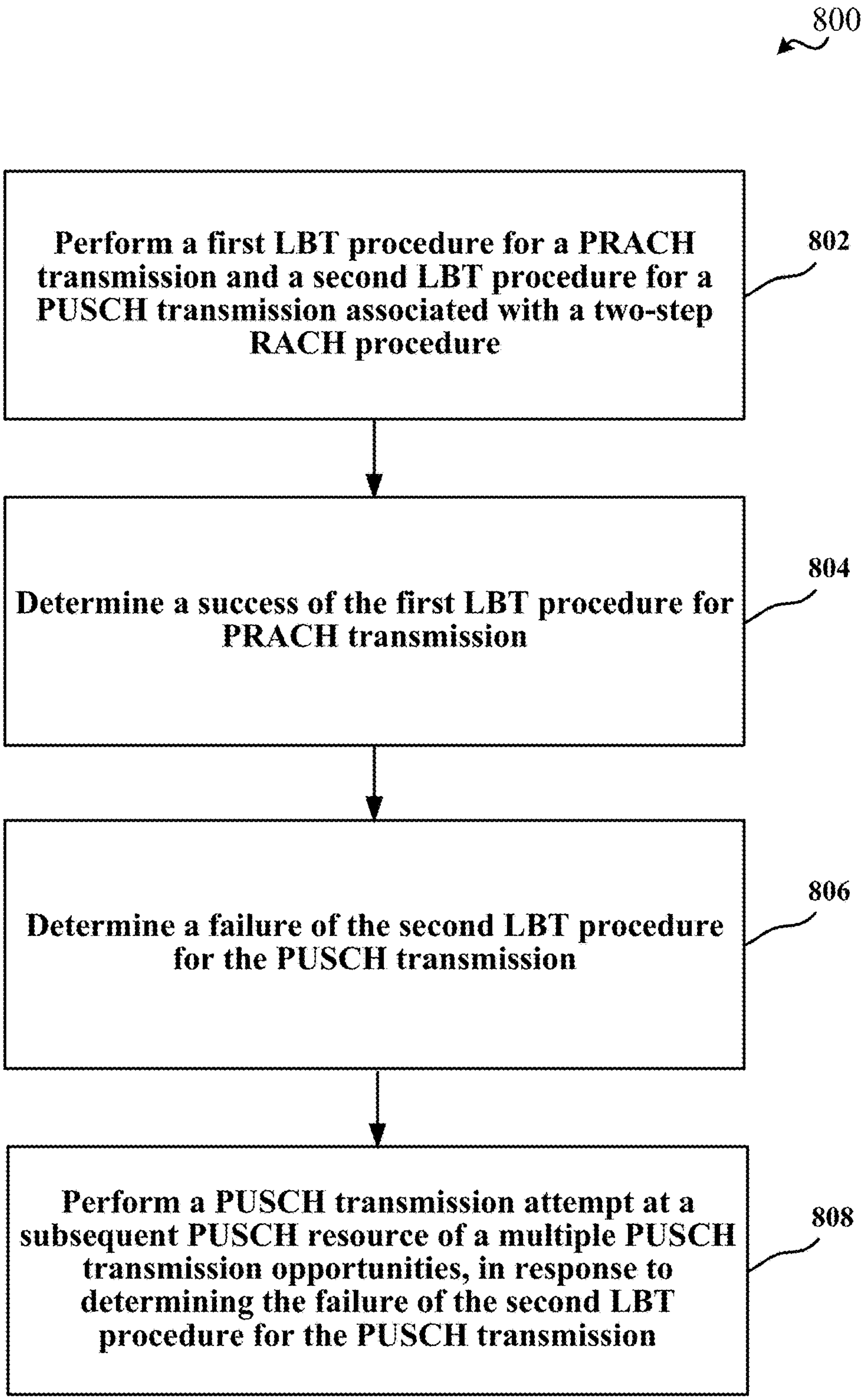
FIG. 8 is a flow chart illustrating an example of a method for wireless communications in accordance with various aspects of the present disclosure, e.g., PRACH success but LBT failure on PUSCH.

FIG. 8 illustrates a flow chart of an example of a method 800 for wireless communication at a UE. In an example, a UE 104 can perform the functions described in method 800 using one or more of the components described in FIGS. 1, 3, and 15.

At block 802, the method 800 may perform a first LBT procedure for a PRACH transmission and a second LBT procedure for a PUSCH transmission associated with a two-step RACH procedure. In an aspect, the communication component 342 including the RACH component 244, e.g., in conjunction with processor(s) 312, memory 316, and/or transceiver 302, may be configured to perform a first LBT procedure for a PRACH transmission and a second LBT procedure for a PUSCH transmission associated with a two-step RACH procedure, as described above in more detail. Thus, the UE 104, the processor(s) 312, the communication component 342 or one of its subcomponents may define the means for performing a first LBT procedure for a PRACH transmission and a second LBT procedure for a PUSCH transmission associated with a two-step RACH procedure.

At block 804, the method 800 may determine a success of the first LBT procedure for PRACH transmission. In an aspect, the communication component 342 including the RACH component 244, e.g., in conjunction with processor (s) 312, memory 316, and/or transceiver 302, may be configured to determine a success of the first LBT procedure for PRACH transmission, as described above in more detail. Thus, the UE 104, the processor(s) 312, the communication component 342 or one of its subcomponents may define the means for determining a success of the first LBT procedure for PRACH transmission.

At block 806, the method 800 may determine a failure of the second LBT procedure for the PUSCH transmission. In an aspect, the communication component 342 including the RACH component 244, e.g., in conjunction with processor (s) 312, memory 316, and/or transceiver 302, may be configured to determine a failure of the second LBT procedure for the PUSCH transmission, as described above in more detail. Thus, the UE 104, the processor(s) 312, the communication component 342 or one of its subcomponents may define the means for determining a failure of the second LBT procedure for the PUSCH transmission.

At block 808, the method 800 may perform a PUSCH transmission attempt at a subsequent PUSCH resource of a multiple PUSCH transmission opportunities, in response to determining the failure of the second LBT procedure for the PUSCH transmission. In an aspect, the communication component 342 including the RACH component 244, e.g., in conjunction with processor(s) 312, memory 316, and/or transceiver 302, may be configured to perform a PUSCH transmission attempt at a subsequent PUSCH resource of a multiple PUSCH transmission opportunities, in response to determining the failure of the second LBT procedure for the PUSCH transmission, as described above in more detail. Thus, the UE 104, the processor(s) 312, the communication component 342 or one of its subcomponents may define the means for performing a PUSCH transmission attempt at a subsequent PUSCH resource of a multiple PUSCH transmission opportunities, in response to determining the failure of the second LBT procedure for the PUSCH transmission.

In some aspects, the multiple PUSCH transmission opportunities may be associated with PRACH resource corresponding to the PRACH transmission.

In some aspects, the method 800 may include forgoing monitoring for a network response until the PUSCH transmission is successful.

In some aspects, the method 800 may include determining a failure of all LBT procedures for the PUSCH transmission, and receiving one or both a fallback RAR or a second message of two-step RACH procedure in response to determining the failure of all LBT procedures for the PUSCH transmission.

In some aspects, the method 800 may include determining whether a power ramping parameter for the PRACH transmission is different from a power ramping parameter for the PUSCH transmission, forgoing power ramping for the PUSCH transmission based on determining that the power ramping parameter for the PRACH transmission is different from the power ramping parameter for the PUSCH transmission, and performing the power ramping for the PUSCH transmission based on determining that the power ramping parameter for the PRACH transmission is not different from the power ramping parameter for the PUSCH transmission.

In some aspects, the method 800 may include determining a failure of all LBT procedures for the PUSCH transmission, and monitoring for a fallback RAR during a monitoring duration in response to determining the failure of all LBT procedures for the PUSCH transmission.

In some aspects, the method 800 may include incrementing a message transmission counter based on determining that a fallback message is not received within the monitoring duration.

In some aspects, the method 800 may include determining whether a power ramping parameter for the PRACH transmission is different from a power ramping parameter for the PUSCH transmission, forgoing power ramping for the PUSCH transmission based on determining that the power ramping parameter for the PRACH transmission is different from the power ramping parameter for the PUSCH transmission, performing the power ramping for the PUSCH transmission based on determining that the power ramping parameter for the PRACH transmission is not different from the power ramping parameter for the PUSCH transmission.

In some aspects, the method 800 may include determining a failure of all LBT procedures for the PUSCH transmission, and selecting a different PRACH resource based on determining a failure of all LBT procedures for the PUSCH transmission.

In some aspects, selecting the different PRACH resource is further based on a network entity configuration.

In some aspects, the method 800 may include forgoing at least one of an incrementing of a message transmission counter or a power ramping.

Figure 9:
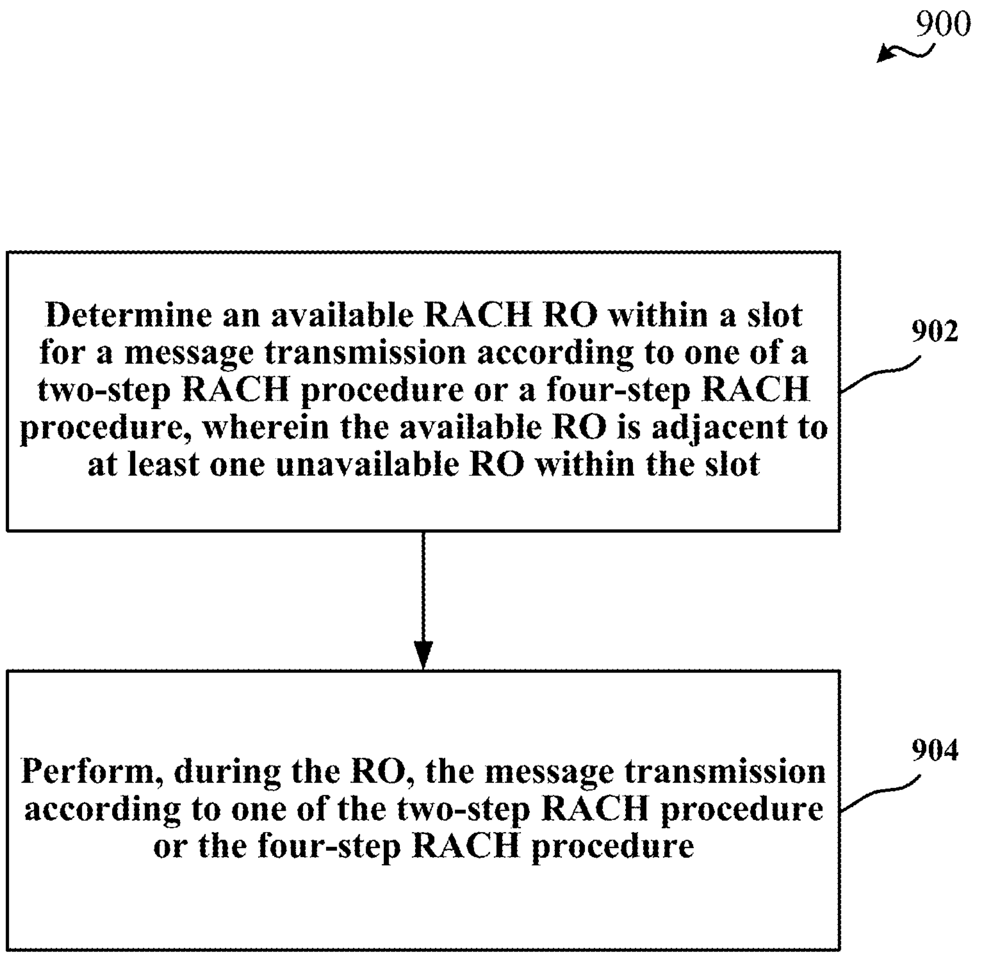
FIG. 9 is a flow chart illustrating an example of a method for wireless communications in accordance with various aspects of the present disclosure, e.g., valid and invalid ROs.

FIG. 9 illustrates a flow chart of an example of a method 900 for wireless communication at a UE relating to providing an LBT gap between ROs. In an example, a UE 104 can perform the functions described in method 900 using one or more of the components described in FIGS. 1, 3, and 15.

At block 902, the method 900 may determine an available RACH RO within a slot for a message transmission according to one of a two-step RACH procedure or a four-step RACH procedure, the available RO is adjacent to at least one unavailable RO within the slot. In an aspect, the communication component 342 including the RACH component 244, e.g., in conjunction with processor(s) 312, memory 316, and/or transceiver 302, may be configured to determine an available RACH RO within a slot for a message transmission according to one of a two-step RACH procedure or a four-step RACH procedure, the available RO is adjacent to at least one unavailable RO within the slot, as described above in more detail. Thus, the UE 104, the processor(s) 312, the communication component 342 or one of its subcomponents may define the means for determining an available RACH RO within a slot for a message transmission according to one of a two-step RACH procedure or a four-step RACH procedure, the available RO is adjacent to at least one unavailable RO within the slot, e.g., via one or more antennas 265 or 1534/1535 of a UE 104.

At block 904, the method 900 may perform, during the RO, the message transmission according to one of the two-step RACH procedure or the four-step RACH procedure. In an aspect, the communication component 342 including the RACH component 244, e.g., in conjunction with processor(s) 312, memory 316, and/or transceiver 302, may be configured to perform, during the RO, the message transmission according to one of the two-step RACH procedure or the four-step RACH procedure, as described above in more detail. Thus, the UE 104, the processor(s) 312, the communication component 342 or one of its subcomponents may define the means for performing, during the RO, the message transmission according to one of the two-step RACH procedure or the four-step RACH procedure, e.g., via one or more antennas 265 or 1534/1535 of a UE 104.

In some aspects, the unavailable RO represents a listen-before-talk (LBT) gap between the available RO and at least one other available RO, e.g., to avoid LBT blocking.

In some aspects, the available RO is associated with only one of the two-step RACH procedure or a four-step RACH procedure.

In some aspects, the two-step RACH procedure and the four-step RACH procedure is associated with a RACH configuration table, and wherein the available RO is determined based on at least the RACH configuration table that lists valid ROs available for RACH procedures and invalid ROs corresponding to LBT gaps as well as coexistence between 2 and 4 step RACH.

In some aspects, the RACH configuration table include a number of available ROs and a number of unavailable ROs for the two-step RACH procedure and a number of available ROs and a number of unavailable ROs for the four-step RACH procedure.

In some aspects, a synchronization signal block (SSB) to RO mapping is valid for the number of available ROs.

In some aspects, each available RO for the four-step RACH configuration procedure is adjacent two unavailable ROs.

In some aspects, the two unavailable ROs correspond to a listen-before-talk (LBT) gap.

In some aspects, a first RO for the two-step RACH procedure corresponds to the available RO.

In some aspects, the available RO is used for physical random access channel (PRACH) transmission.

In some aspects, one or more remaining symbols are used for physical uplink shared channel (PUSCH) transmission.

In some aspects, the RACH configuration table allocates all ROs except for a last RO within the number of available ROs for the four-step RACH procedure, and wherein the last RO is allocated as available for the two-step RACH procedure.

In some aspects, a number of symbols immediately after the last RO are allocated for a physical uplink shared channel (PUSCH) transmission associated with the two-step RACH procedure.

In some aspects, determining that a physical random access channel (PRACH) transmission occupies an entirety of the slot; and performing the PUSCH transmission in subsequent symbols of the next slot.

In some aspects, a last RO within a slot of a four-step RACH procedure corresponds to the at least one unavailable RO, and wherein the two-step RACH procedure and the four-step RACH procedure share a second to last RO.

In some aspects, a number of symbols immediately after the second to last RO are allocated for a physical uplink shared channel (PUSCH) transmission associated with the two-step RACH procedure.

Figure 10:
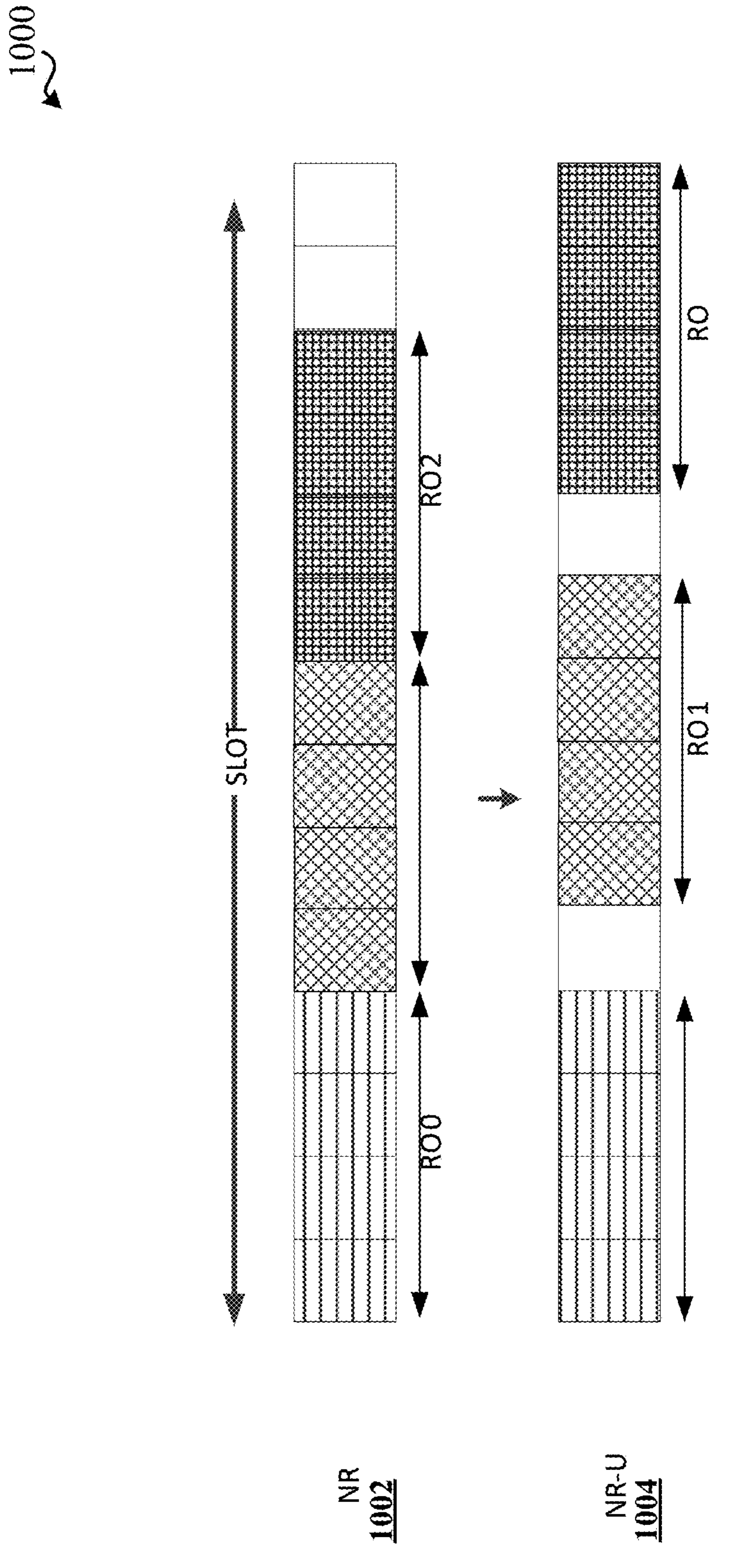
FIG. 10 is a conceptual diagram of a slot level representation of RACH occasions (ROs) for New Radio (NR) and NR Unlicensed (NR-U) communications, in accordance with various aspects of the present disclosure.

FIG. 10 is a conceptual diagram of a slot level representation 1000 of ROs for NR and NR-U communications. For example, an NR 1002 level slot representation is shown as well as an NR-U 1004 slot level representation. Specifically, the NR 1002 level slot representation demonstrates consecutive ROs without any symbol level gaps within a slot. That is, RO 0, RO 1, and RO 2 are scheduled consecutively such that no symbol level gap exists between the ROs. However, in NR-U, to avoid LBT blocking, symbol level gaps may be configured/scheduled. For instance, a symbol level gap may exist or otherwise be scheduled between RO 0 and RO 1, as well as RO 1 and RO 2.

Figure 11:
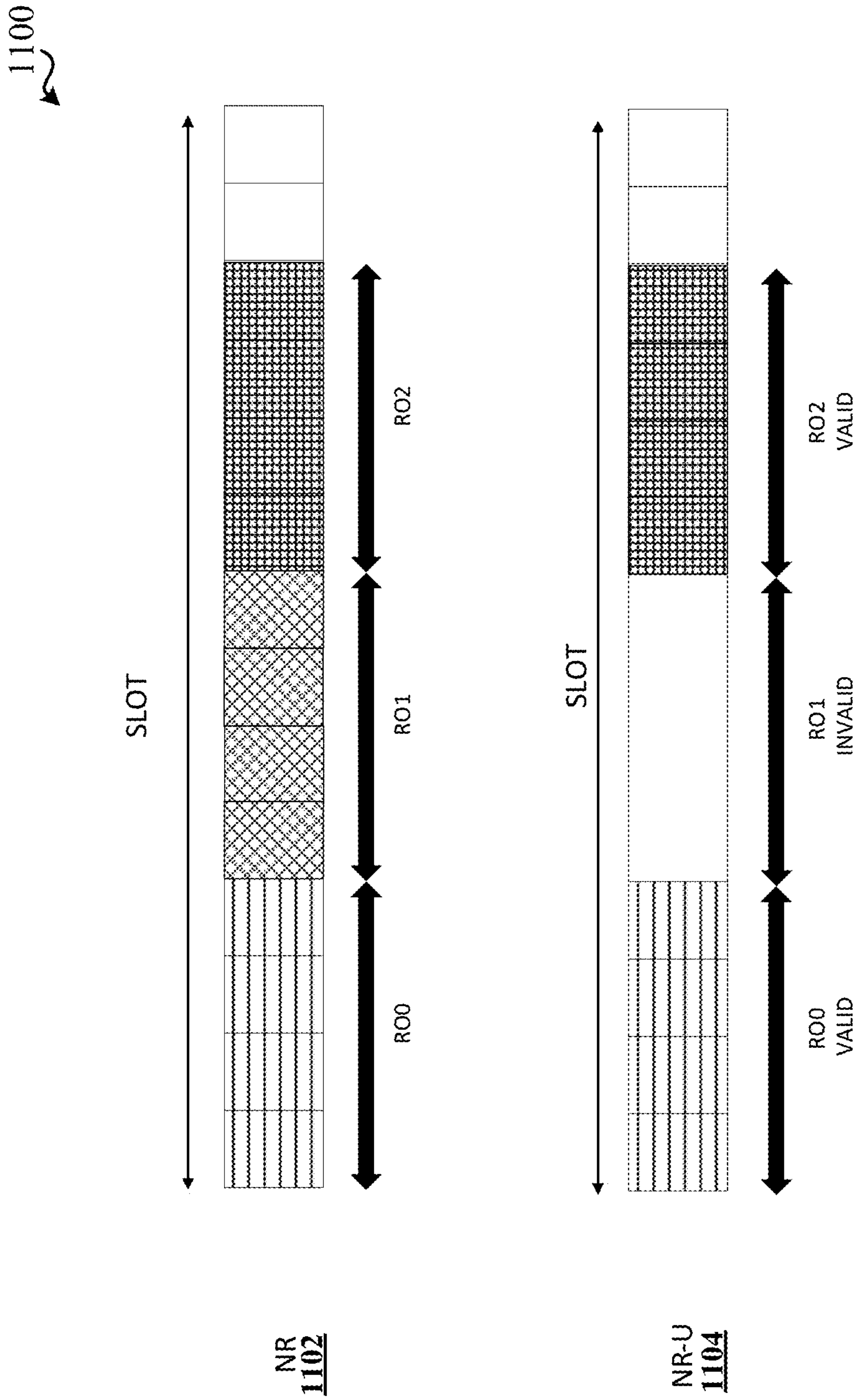
FIG. 11 is a conceptual diagram of a slot level representation of ROs including LBT gaps for NR and NR-U communications, in accordance with various aspects of the present disclosure.

FIG. 11 is a conceptual diagram of a slot level representation 1100 of ROs including LBT gaps NR and NR-U communications. For example, an NR 1102 level slot representation is shown as well as an NR-U 1104 slot level representation. Specifically, the NR 1102 level slot representation demonstrates consecutive ROs without any symbol level gaps within a slot. That is, RO 0, RO 1, and RO 2 are scheduled consecutively such that no symbol level gap exists between the ROs. For NR-U, however, to avoid LBT blocking, gaps can be created by using alternate ROs. For example, RO 0 and RO 2 may be valid, and RO 1 may be invalid.

Figure 12:
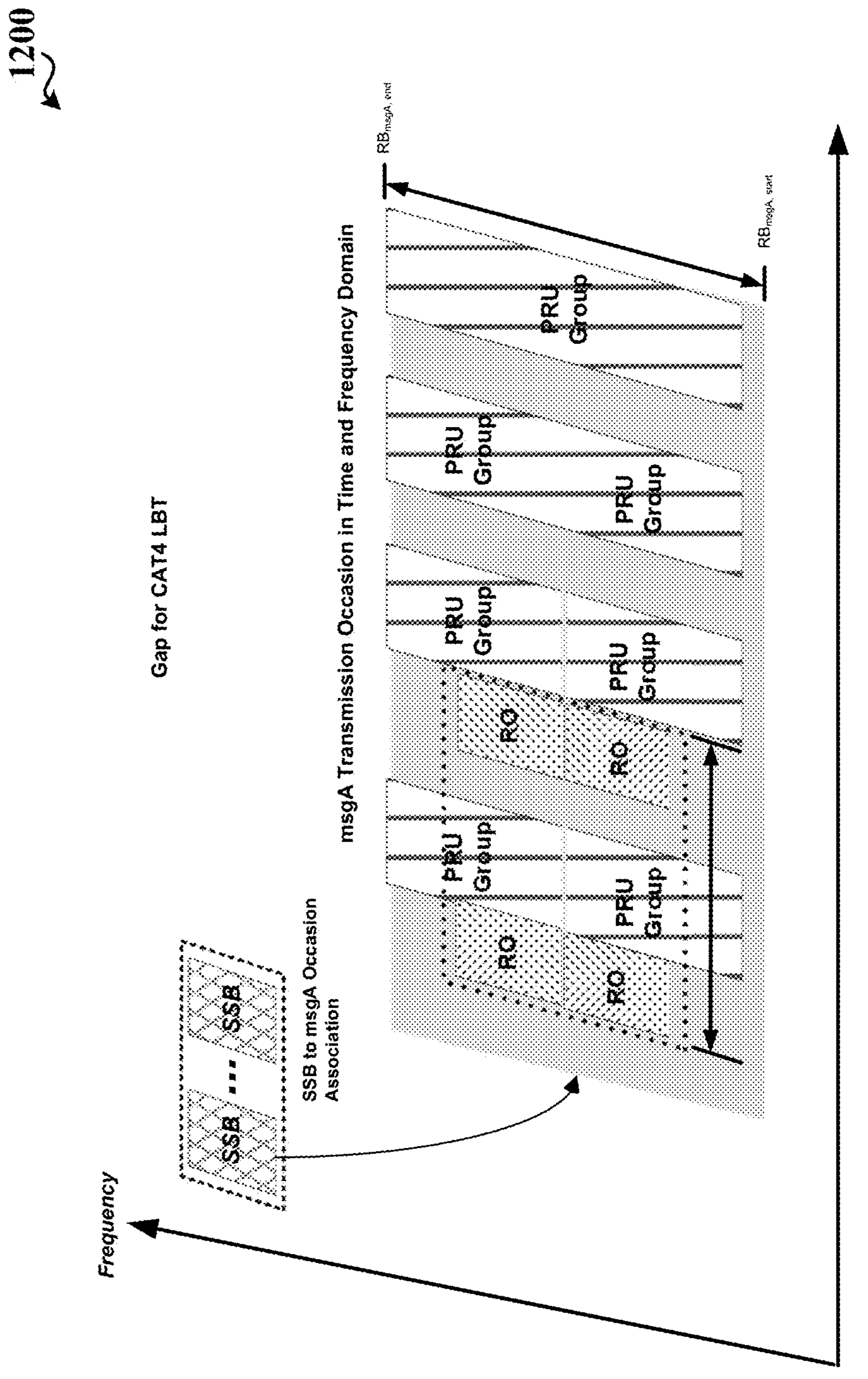
FIG. 12 is a conceptual diagram of a 2-step RACH Message A transmission occasion in time and frequency domain, in accordance with various aspects of the present disclosure.

FIG. 12 is a conceptual diagram of a Message A transmission occasion in time and frequency domain. Specifically, Message A may include both Msg1 (PRACH) and Msg 3 (PUSCH). Further, PUSCH may be sent along with PRACH. Additionally, the PUSCH position (PRU) can be configured along with RO or independently. In some aspects, 2 step RACH may use different RO compared to 4 step RACH. Also, if using the same RO, the 2 step and 4 step RACH procedures may use different preamble sequences.

Figure 13:
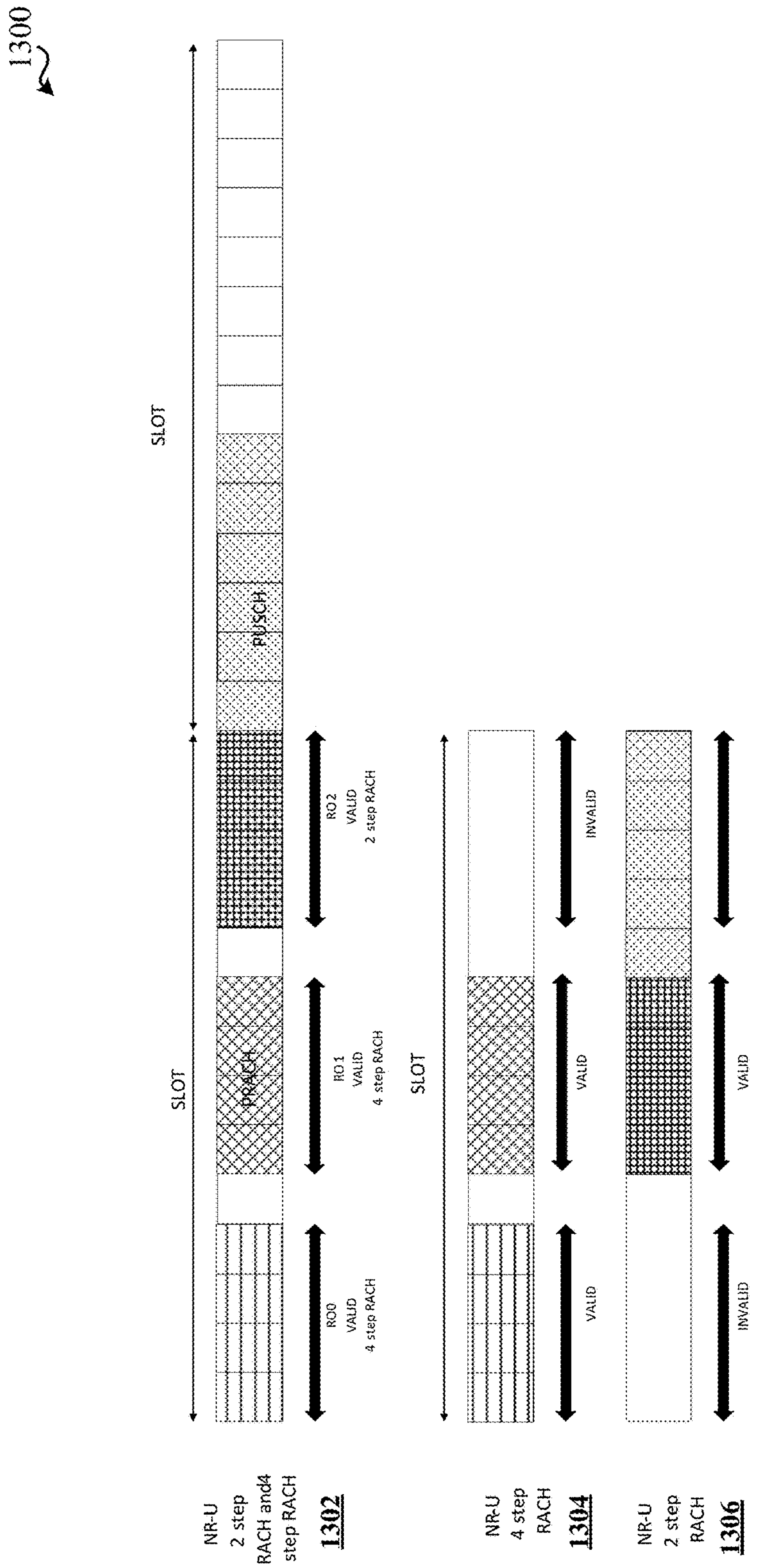
FIG. 13 is a conceptual diagram of 2-step and 4-step RACH coexistence in accordance with various aspects of the present disclosure.

FIG. 13 is a conceptual diagram of 2-step and 4-step RACH coexistence 1300. For instance, the 2-step and 4-step RACH coexistence 1300 may include an NR-U 2 step RACH and 4 step RACH 1302, an NR-U 4 step RACH 1304, and an NR-U 2 step RACH 1306. For example, in the 2 step RACH and 4 step RACH 1302, a symbol level gap may exist between RO 0 corresponding to a valid 4 step RACH, RO 1 corresponding to a valid 4 step RACH, and RO 2 corresponding to a valid 2 step RACH. Further, PUSH transmission may occur in a subsequent slot within symbols adjacent RO 2 In the NR-U 4 step RACH 1304, RO 0 and RO 1 may be valid, but RO 3 may be invalid, with all ROs separated by a symbol level gap. That is, the last RO may be left vacant. In the NR-U 2 step RACH 1306, RO 1 may be invalid and separated by a symbol level gap with RO 1, which may be valid. RO 1 and RO 2 may not be separated by any LBT gap, and instead PUSCH transmission may occupy RO 2.

Figure 14:
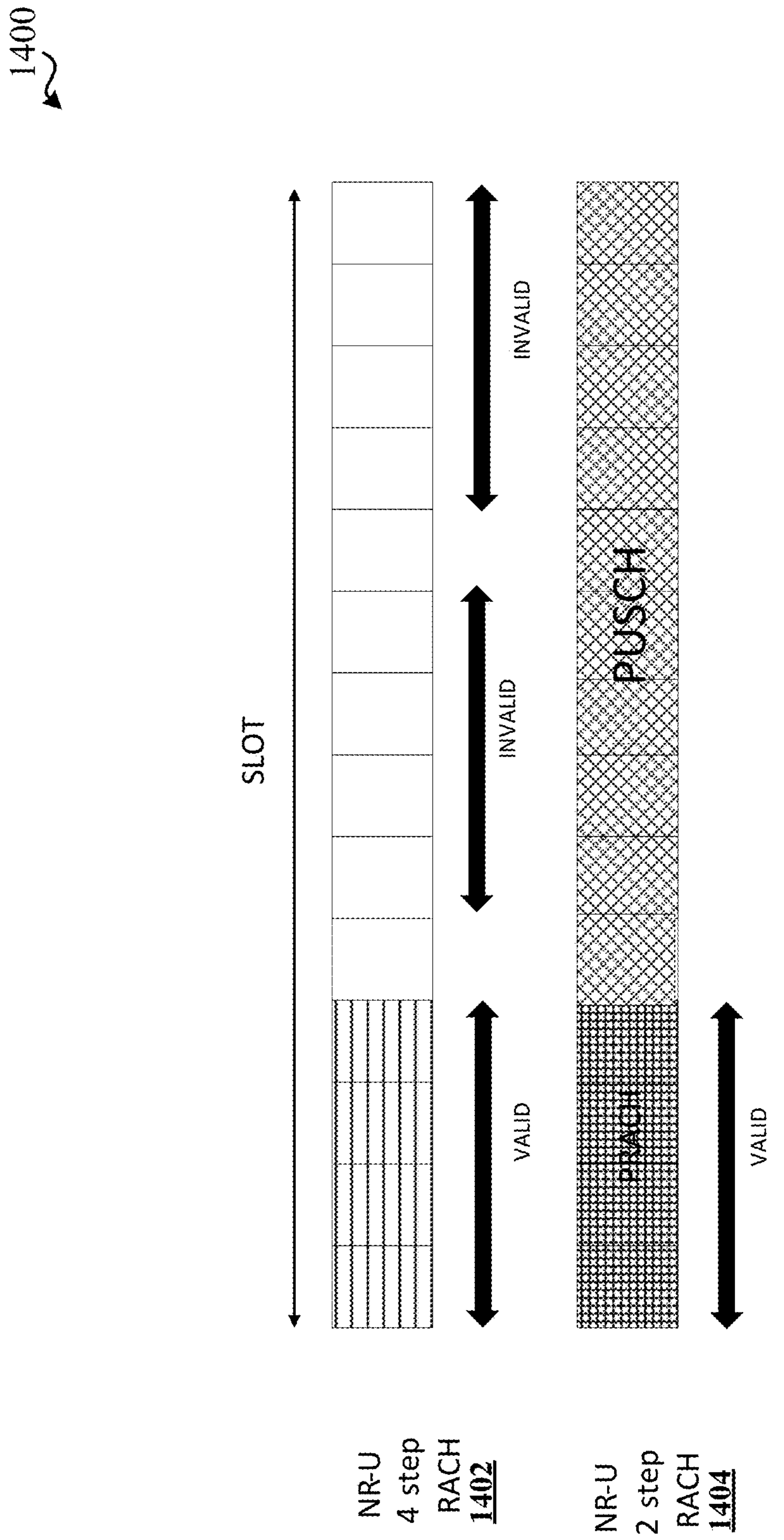
FIG. 14 is a conceptual diagram of another example of -step and 4-step RACH coexistence in accordance with various aspects of the present disclosure.

FIG. 14 is conceptual diagram of an example 2-step and 4-step RACH coexistence 1400. For instance, the 2-step and 4-step RACH coexistence 1400 may include an NR-U 4 step RACH 1402 and an NR-U 2 step RACH 1404. Specifically, for a shared RO instance where a 4-step RACH shares an RO with a 2-step RACH, only the first RO may be considered valid. For example, for 4-step RACH, if at least one RO is shared with a 2-step RACH, the first RO may be kept or maintained. This may be because legacy UEs may be included or otherwise operate in NR-U. Hence, as shown in the 2-step and 4-step RACH coexistence 1400 scheme, only RO0 may be used for both 4 and 2 step RACH. No other ROs may be used, and the remaining symbols may be used for 2-step PUSCH by configuration.

Figure 15:
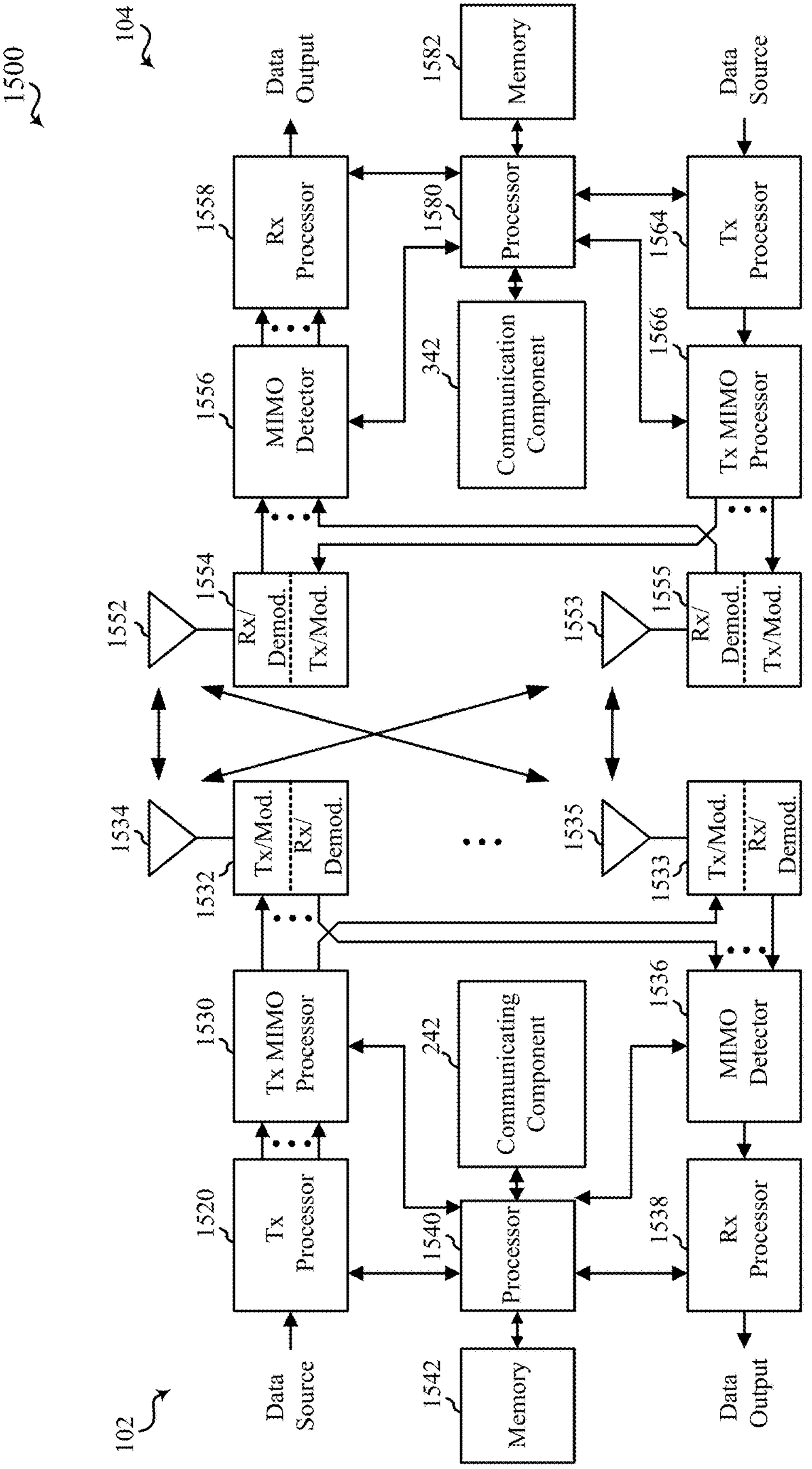
FIG. 15 is a block diagram illustrating an example of a MIMO communication system including a base station and a UE, in accordance with various aspects of the present disclosure.

FIG. 15 is a block diagram of a MIMO communication system 1500 including a base station 102 and a UE 104. The MIMO communication system 1500 may illustrate aspects of the wireless communication access network 100 described with reference to FIG. 1. The base station 102 may be an example of aspects of the base station 102 described with reference to FIG. 1. The base station 102 may be equipped with antennas 1534 and 1535, and the UE 104 may be equipped with antennas 1552 and 1553. In the MIMO communication system 1500, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1520 may receive data from a data source. The transmit processor 1520 may process the data. The transmit processor 1520 may also generate control symbols or reference symbols. A transmit MIMO processor 1530 may perform spatial processing (e.g., precoding) on data symbols, control symbols, or reference symbols, if applicable, and may provide output symbol streams to the transmit modulator/demodulators 1532 and 1533. Each modulator/demodulator 1532 through 933 may process a respective output symbol stream (e.g., for OFDM, etc.) to obtain an output sample stream. Each modulator/demodulator 1532 through 1533 may further process (e.g., convert to analog, amplify, filter, and upconvert) the output sample stream to obtain a DL signal. In one example, DL signals from modulator/demodulators 1532 and 1533 may be transmitted via the antennas 1534 and 1535, respectively.

The UE 104 may be an example of aspects of the UEs 104 described with reference to FIGS. 1 and 2. At the UE 104, the UE antennas 1552 and 1553 may receive the DL signals from the base station 102 and may provide the received signals to the modulator/demodulators 1554 and 1555, respectively. Each modulator/demodulator 1554 through 1555 may condition (e.g., filter, amplify, downconvert, and digitize) a respective received signal to obtain input samples. Each modulator/demodulator 1554 through 1555 may further process the input samples (e.g., for OFDM, etc.) to obtain received symbols. A MIMO detector 1456 may obtain received symbols from the modulator/demodulators 1554 and 1555, perform MIMO detection on the received symbols, if applicable, and provide detected symbols. A receive (Rx) processor 1558 may process (e.g., demodulate, deinterleave, and decode) the detected symbols, providing decoded data for the UE 104 to a data output, and provide decoded control information to a processor 1580, or memory 1582.

The processor 1580 may in some cases execute stored instructions to instantiate a communicating component 242 (see e.g., FIGS. 1 and 2).

On the uplink (UL), at the UE 104, a transmit processor 1564 may receive and process data from a data source. The transmit processor 1564 may also generate reference symbols for a reference signal. The symbols from the transmit processor 1564 may be precoded by a transmit MIMO processor 1566 if applicable, further processed by the modulator/demodulators 1554 and 1555 (e.g., for SC-FDMA, etc.), and be transmitted to the base station 102 in accordance with the communication parameters received from the base station 102. At the base station 102, the UL signals from the UE 104 may be received by the antennas 1534 and 1535, processed by the modulator/demodulators 1532 and 1533, detected by a MIMO detector 1536 if applicable, and further processed by a receive processor 1538. The receive processor 1538 may provide decoded data to a data output and to the processor 1540 or memory 1542.

The components of the UE 104 may, individually or collectively, be implemented with one or more ASICs adapted to perform some or all of the applicable functions in hardware. Each of the noted modules may be a means for performing one or more functions related to operation of the MIMO communication system 1500. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1500.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a user equipment (UE), comprising:

performing a first listen-before-talk (LBT) procedure for a physical random access channel (PRACH) transmission of a Message A transmission in a two-step random access channel (RACH) procedure and a second LBT procedure for a physical uplink shared channel (PUSCH) transmission of the Message A transmission in the two-step RACH procedure;

incrementing a power ramping counter associated with a common power ramping for both the PRACH and the PUSCH transmissions;

identifying a success of the first LBT procedure for the PRACH transmission;

transmitting the PRACH transmission over a PRACH resource based on identifying success of the first LBT procedure;

identifying a failure of the second LBT procedure for the PUSCH transmission;

performing a PUSCH transmission attempt at a subsequent PUSCH resource of multiple PUSCH transmission opportunities singularly associated to the PRACH resource, based on identifying the failure of the second LBT procedure for the PUSCH transmission;

identifying a failure of all LBT procedures for the PUSCH transmission;

receiving one or both of a fallback random access response (RAR) or a second message of two-step RACH procedure in response to identifying the failure of all LBT procedures for the PUSCH transmission;

identifying whether a power ramping parameter for the PRACH transmission is different from a power ramping parameter for the PUSCH transmission;

forgoing power ramping for the PUSCH transmission associated with identifying that the power ramping parameter for the PRACH transmission is different from the power ramping parameter for the PUSCH transmission; and performing the power ramping for the PUSCH transmission associated with identifying that the power ramping parameter for the PRACH transmission is not different from the power ramping parameter for the PUSCH transmission.

2. The method of claim 1, further comprising forgoing monitoring for a network response until the PUSCH transmission is successful.

3. The method of claim 1, further comprising:

monitoring for the fallback RAR during a monitoring duration associated with identifying the failure of all LBT procedures for the PUSCH transmission.

4. The method of claim 3, further comprising incrementing a message transmission counter based on determining that a fallback message is not received within the monitoring duration.

5. An apparatus for wireless communication, comprising:

a transceiver;

a memory configured to store instructions; and at least one processor communicatively coupled with the transceiver and the memory, wherein the at least one processor is configured to:

perform a first listen-before-talk (LBT) procedure for a physical random access channel (PRACH) transmission of a Message A transmission in a two-step random access channel (RACH) procedure and a second LBT procedure for a physical uplink shared channel (PUSCH) transmission of the Message A transmission in the two-step RACH procedure;

increment a power ramping counter associated with a common power ramping for both the PRACH and the PUSCH transmissions;

identify a success of the first LBT procedure for the PRACH transmission;

transmit the PRACH transmission over a PRACH resource based on identifying success of the first LBT procedure;

identify a failure of the second LBT procedure for the PUSCH transmission;

perform a PUSCH transmission attempt at a subsequent PUSCH resource of multiple PUSCH transmission opportunities singularly associated to the PRACH resource, based on identifying the failure of the second LBT procedure for the PUSCH transmission;

identify a failure of all LBT procedures for the PUSCH transmission;

receive one or both of a fallback random access response (RAR) or a second message of two-step RACH procedure associated with identifying the failure of all LBT procedures for the PUSCH transmission;

identify whether a power ramping parameter for the PRACH transmission is different from a power ramping parameter for the PUSCH transmission;

forgo power ramping for the PUSCH transmission associated with identifying that the power ramping parameter for the PRACH transmission is different from the power ramping parameter for the PUSCH transmission; and perform the power ramping for the PUSCH transmission associated with identifying that the power ramping parameter for the PRACH transmission is not different from the power ramping parameter for the PUSCH transmission.

6. The apparatus of claim 5, wherein the at least one processor is further configured to forgo monitoring for a network response until the PUSCH transmission is successful.

7. The apparatus of claim 5, wherein the at least one processor is further configured to:

monitor for the fallback RAR during a monitoring duration associated with identifying the failure of all LBT procedures for the PUSCH transmission.

8. The apparatus of claim 7, wherein the at least one processor is further configured to increment a message transmission counter associated with identifying that a fallback message is not received within the monitoring duration.

* * * * *